(12) United States Patent
Cardis

(10) Patent No.: US 12,322,273 B1
(45) Date of Patent: Jun. 3, 2025

(54) WEARABLE DEVICE AND METHOD FOR BACKFEED COMMUNICATION FOR PERSONAL SECURITY

(71) Applicant: WC Ideal Products, LLC, Avon, IN (US)

(72) Inventor: Rachel Cardis, Avon, IN (US)

(73) Assignee: WC Ideal Products, LLC, Avon, IN (US)

( * ) Notice: Subject to any disclaimer, the term of this patent is extended or adjusted under 35 U.S.C. 154(b) by 0 days.

(21) Appl. No.: 18/988,462

(22) Filed: Dec. 19, 2024

Related U.S. Application Data

(63) Continuation of application No. 18/964,323, filed on Nov. 29, 2024.

(60) Provisional application No. 63/604,191, filed on Nov. 30, 2023.

(51) Int. Cl.
  *G08B 25/01* (2006.01)
  *G06F 1/16* (2006.01)
  *H04N 7/18* (2006.01)

(52) U.S. Cl.
  CPC .......... *G08B 25/016* (2013.01); *G06F 1/163* (2013.01); *H04N 7/188* (2013.01)

(58) Field of Classification Search
  CPC ........ G08B 25/016; G06F 1/163; H04N 7/188
  USPC ...................................................... 340/540
  See application file for complete search history.

(56) References Cited

U.S. PATENT DOCUMENTS

| | | | |
|---|---|---|---|
| 7,636,047 B1 | 12/2009 | Sempek | |
| 8,698,623 B1 | 4/2014 | Hicks | |
| 9,300,555 B2 | 3/2016 | Mukherjee et al. | |
| D779,994 S | 2/2017 | Roberts et al. | |
| 9,955,870 B2 | 5/2018 | Dunlavey | |
| 10,049,550 B2 | 8/2018 | Nguyen | |
| 10,096,225 B2 | 10/2018 | Thomas | |
| 11,846,989 B1 | 12/2023 | Edwards | |
| 2016/0277649 A1* | 9/2016 | Taran Katz | G03B 17/56 |
| 2019/0051132 A1 | 2/2019 | Shepard | |
| 2019/0275404 A1* | 9/2019 | Inman | A41D 19/002 |
| 2022/0225933 A1 | 7/2022 | Rehn | |
| 2023/0127672 A1* | 4/2023 | Grening | G03B 29/00 368/10 |
| 2023/0351364 A1* | 11/2023 | Colbert | G06Q 20/321 |
| 2024/0268353 A1* | 8/2024 | Young | A01K 27/001 |

* cited by examiner

*Primary Examiner* — Naomi J Small
(74) *Attorney, Agent, or Firm* — Outlier Patent Attorneys, PLLC

(57) ABSTRACT

A user wearable monitoring device for improved personal security includes a band, a clasp configured for moving between an open position and a closed position, a removable chip coupled to the band, and a digital locking mechanism configured for monitoring detachment. A method of digitally locking the device includes receiving a signal from a user input device and rotating contact sensors into a locked position in response to the signal. A method of unlocking the device may include receiving a second signal from the user input device, or receiving input from the contact sensors, and rotating the contact sensors into an unlocked position. In this manner, the digital locking mechanism is configured for recognizing unauthorized detachment of the device from the user.

25 Claims, 13 Drawing Sheets

WEARABLE DEVICE AND METHOD FOR BACKFEED COMMUNICATION FOR PERSONAL SECURITY

CROSS-REFERENCE TO RELATED APPLICATIONS

This application is a continuation of U.S. Non-Provisional application Ser. No. 18/964,323, filed on Nov. 29, 2024, titled "WEARABLE DEVICE AND METHOD FOR BACKFEED COMMUNICATION FOR PERSONAL SECURITY", which claims the benefit of U.S. Provisional Application 63/604,191, filed Nov. 30, 2023, titled "WEARABLE DEVICE BAND APPARATUS AND METHOD FOR BACKFEED COMMUNICATION SYSTEM FOR PERSONAL SECURITY," the contents of both of which are incorporated herein by reference.

BACKGROUND

Field of the Art

The present disclosure is related to the fields of wearable devices and personal security. In particular, the present disclosure relates to a wearable device that enhances personal security, discourages detachment, and minimizes false alerts.

Discussion of the State of the Art

Wearable devices for personal security and tracking have become increasingly popular in recent years. However, existing wearable security devices suffer from several limitations and drawbacks. One significant problem is the risk of detachment-many wearable devices can be easily removed by a perpetrator in an emergency situation, rendering them ineffective for tracking the wearer's location or sounding an alarm. Further, a user may detach the device themselves unbeknownst to a third party, such as a caregiver or emergency services.

Another issue with current wearable security devices is the occurrence of false alerts. Without sufficient sensors and data analysis to accurately detect a true emergency, existing devices are prone to triggering false alarms that can desensitize responders and reduce trust in the system. Devices that rely solely on a smartphone or other connected device for alerting are also vulnerable, as a perpetrator could easily discard or disable the secondary device.

Furthermore, many wearable security products on the market are designed as single-purpose devices. They do not incorporate the health monitoring and fitness tracking capabilities that have become standard features in modern wearables. The lack of multi-functionality makes dedicated security wearables less appealing and less likely to be worn consistently.

Prior attempts to address these issues have fallen short. Some have proposed wearable security devices with locking mechanisms to prevent unwanted removal, but the locking designs have been cumbersome and not foolproof. Others have tried to mitigate false alerts by adding confirmation steps before triggering an alarm, but this delays response in true emergencies. Integrating security features with health and fitness monitoring has been challenging due to size and battery constraints.

Current systems for monitoring wearable personal security and health devices often fail to effectively manage power consumption, leading to several limitations. These devices typically rely on continuous data collection and transmission, which places a significant burden on their limited battery capacity. Existing solutions often prioritize functionality over efficiency, resulting in frequent recharging or device downtime that can compromise user experience and reliability. Additionally, many monitoring systems lack adaptive power management strategies that consider variables such as user activity, sensor usage patterns, or environmental conditions, which could optimize energy use dynamically. This inefficiency not only reduces operational lifespan but also impacts the device's utility in critical scenarios, such as emergencies or extended periods without access to charging infrastructure. The need for an innovative approach to power management is evident to enhance the practicality and effectiveness of these wearable devices.

Wearable personal security and health devices are increasingly subject to security vulnerabilities, particularly from attackers who are aware of their tracking capabilities. Malicious actors may exploit these devices by intercepting their signals, using jamming techniques, or even identifying the devices' predictable energy signatures to compromise user safety or disable tracking features. To address these risks, current solutions employ methods such as encryption protocols to secure data transmission, signal obfuscation to mask device presence, and tamper-detection mechanisms to alert users of interference. Additionally, some systems implement adaptive signal modulation to reduce the predictability of transmissions, making it harder for attackers to pinpoint or disrupt the device. However, these measures often come at the expense of increased power consumption and processing demands, creating a trade-off between security and battery life that remains inadequately resolved in existing designs.

False alarms are a persistent issue in wearable personal security and health devices, undermining user trust and reducing the overall effectiveness of these systems. These devices often rely on sensors and algorithms to detect potentially hazardous situations or health anomalies, but inaccuracies in environmental data, user activity, or algorithmic interpretation can trigger unwarranted alerts. False alarms not only cause unnecessary stress for users but may also desensitize them to legitimate alerts over time. To address this, current solutions utilize multi-sensor fusion techniques to corroborate data from multiple sources, reducing the likelihood of erroneous triggers. Machine learning models are also employed to refine detection criteria based on user-specific patterns and contextual data, improving precision over time. Additionally, some systems incorporate user feedback loops, allowing individuals to label false alarms and further train the device's algorithms to distinguish between genuine and spurious events. Despite these advancements, achieving a balance between sensitivity and specificity remains a significant challenge.

Wearable personal security and health devices often face challenges with proper user identification, which can compromise their effectiveness and security. These devices typically rely on authentication methods such as PIN codes, biometric data, or pairing with a user's smartphone to verify identity. However, issues such as shared devices, stolen wearables, or environmental factors affecting biometric sensors—like sweat, dirt, or poor lighting—can lead to misidentification or unauthorized access. To address these challenges, current solutions implement multi-factor authentication, combining biometrics with device proximity or behavioral patterns, such as walking gait or typing rhythm, to enhance accuracy. Additionally, some systems utilize machine learning algorithms to continuously authenticate users based on real-time physiological and behavioral data. While these approaches improve reliability, they may still fall short in scenarios involving identical twins, rapid physiological changes, or deliberate spoofing attempts, leaving room for further innovation in secure and seamless user identification methods.

Wearable personal security and health devices often rely on smartphones for critical functionality, including user identification, data processing, and communication. While this integration enhances device capabilities, it also introduces challenges. Dependence on a paired phone means the wearable's effectiveness is limited if the phone is lost, stolen, out of battery, or simply not nearby. Additionally, the reliance on smartphones for user identification often hinges on Bluetooth connections or app-based credentials, which can be disrupted by connectivity issues, outdated software, or unauthorized access to the phone itself. Current solutions attempt to mitigate these challenges by incorporating fallback mechanisms, such as storing limited user credentials locally on the wearable or enabling emergency communication independent of the phone. Some devices also utilize encrypted communication protocols to safeguard the connection between the wearable and the smartphone. However, these measures are not foolproof and often lead to trade-offs in usability, requiring further advancements to reduce dependence on smartphones while maintaining robust functionality and security.

SUMMARY

The present invention is a comprehensive, self-contained wearable security device in the form of a band worn on the user's wrist. The device incorporates a novel digital locking mechanism that securely fastens the band to the user's wrist and detects any unauthorized attempt at removal. Once the band is locked, an array of sensors is activated, continuously monitoring the user's vital signs, activity levels, and location. The locked configuration of the device is confirmed by a user inputting a security code into an app on the user's mobile device. For redundancy, the locked configuration is also confirmed by contact sensors. If the device is detached without first digitally unlocking the device (by inputting the security code again, for example), the user is notified through backfeed signalization and/or the device emits an alert. In this manner, unauthorized detachment is prevented or minimized.

The onboard processors analyze the sensor data to detect patterns indicative of an emergency situation, such as an abrupt change in vital signs paired with a shift in location. This inventive solution provides an improvement over prior art by only activating monitoring during a digitally locked state, thereby conserving energy and ensuring privacy when not in use.

The wearable device houses a discrete GPS transmitter, which provides an added layer of security by continuously tracking the user's location. An emergency situation triggers an alert protocol wherein the wearable device initiates direct contact with emergency responders, providing real-time location tracking to aid in a swift response.

The wearable device also incorporates a removable chip and emergency codes to ensure a proper escalation of the alarm state, and a direct link to 911 for immediate response. An automatic camera and microphone provide visual and audio evidence, and the design of the band makes it difficult to block the camera.

The band includes a wrist scan for user identification, adding another layer of security. The device also employs novel motion and pressure tracking, which can be used to activate an alarm state. Being a fully contained solution, the band does not require a phone to call emergency services, making it a standalone security and health monitoring device.

This inventive solution provides several benefits. It offers continuous monitoring of the wearer's vital signs, activity levels, and location, providing an added layer of safety. The use of a digital locking mechanism enhances security and recognizes unauthorized detachment, and the device's ability to directly contact emergency services expedites response times in emergency situations. The wearable device is self-contained and stand-alone, eliminating the need for additional devices or services.

BRIEF DESCRIPTION OF THE DRAWINGS

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

DETAILED DESCRIPTION

Figure 1:
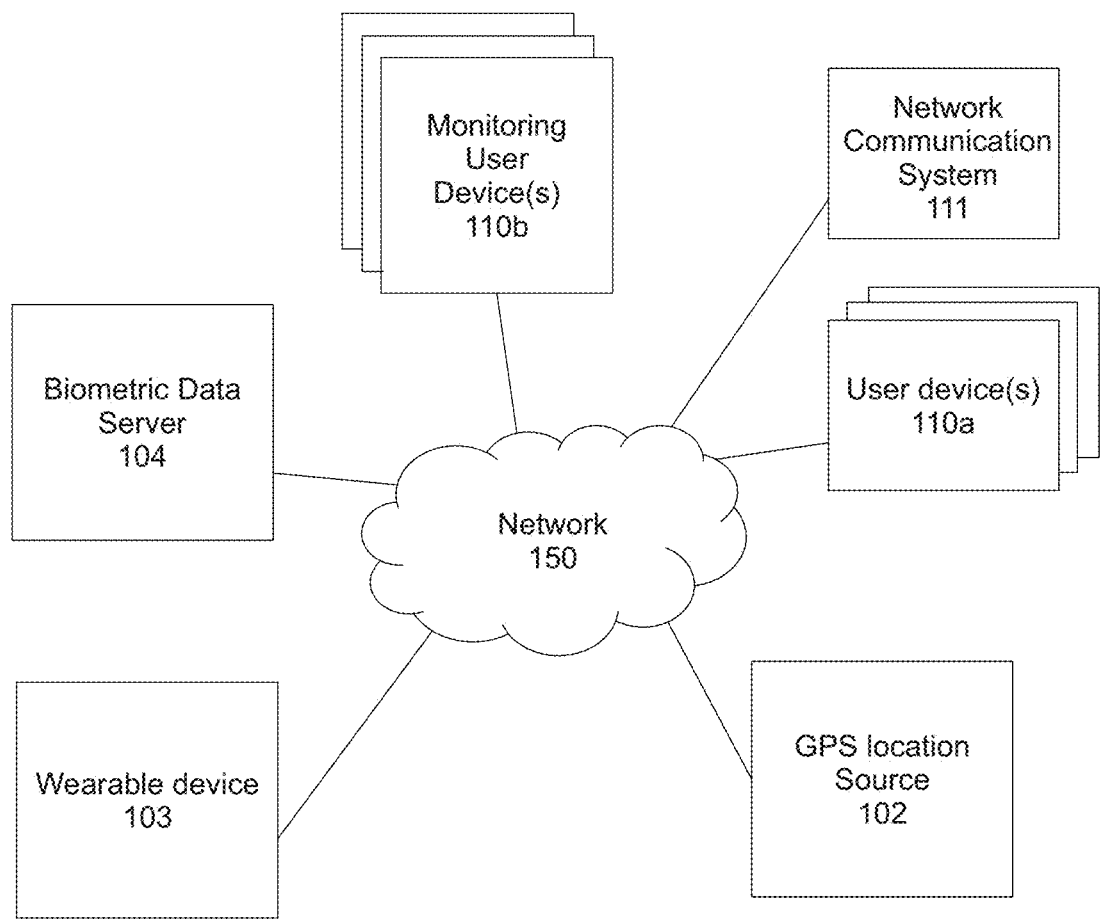
FIG. 1 illustrates a system for a wearable device for improving personal security in accordance with an exemplary embodiment of the invention.

The present invention is a wearable device that enhances personal security, discourages and recognizes detachment, and minimizes false alarms. The wearable device includes sensors for monitoring a user's biometrics, a digital locking feature, a removable chip that can be pulled off in case of emergency, and a wrist scanner that confirms the identity of the user. The wearable device is programmed with a backfeed signalization procedure that minimizes false alarms.

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

The detailed description set forth herein in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Conceptual Architecture

FIG. 1 illustrates an exemplary embodiment of a monitoring system according to one embodiment. The system includes GPS location source 102, wearable device 103, biometric data server 104, user device(s) 110*a*, monitoring user device(s) 110*b*, network communication system 111, and a network 150 over which the various systems communicate and interact. The various components described herein are exemplary and for illustration purposes only and any combination or subcombination of the various components may be used as would be apparent to one of ordinary skill in the art. The system may be reorganized or consolidated, as understood by a person of ordinary skill in the art, to perform the same tasks on one or more other servers or computing devices without departing from the scope of the invention.

The GPS location source 102 may comprise a module for providing a location for the wearable device 103. The GPS location source 102 may comprise a component designed for reliable and precise location tracking in real time. The GPS location source 102 may operate by integrating satellite-based navigation systems, namely GPS, GLONASS, or Galileo. By leveraging these satellite systems, the device 103 can determine its position with a high degree of accuracy. The system functions by receiving signals from the aforementioned satellite systems and computing its location based on the time delay of the received signals. This allows the device 103 to continuously update its position and provide real-time location tracking.

Enhancing its functionality, the GPS location source 102 may also feature advanced technologies such as geofencing and accelerometer integration. Geofencing allows the system to set virtual boundaries, triggering an action when the device 103 enters or exits these predefined areas. The integration of an accelerometer enables the system to measure the device's motion and orientation, complementing the location data received from the satellites. As for alternatives, instead of GPS, GLONASS, or Galileo, the system could potentially utilize other satellite navigation systems such as BeiDou. Additionally, instead of using an accelerometer, other motion sensors like a gyroscope or a magnetometer could be used.

The wearable device 103 may comprise a device worn on the user's body. The wearable device 103 may comprise a wearable band, bearing similarities to a traditional watchband, which houses all the necessary sensors and communication modules required for the device 103 to function. This self-contained wearable device 103 serves as a multifunctional tool capable of monitoring various health and safety parameters. The wearable device 103 may be designed to continuously monitor the user's vital signs, activity levels, and geographical location. The wearable device 103 may comprise an array of integrated sensors, which are activated when the band is locked onto the user's wrist. These sensors gather data, which is then processed by the onboard processors within the band. Any detected patterns that might suggest an emergency situation, such as a sudden alteration in vital signs coinciding with a change in location, triggers the device to initiate an alert protocol, notifying predetermined responders. The communication modules within the wearable device 103 facilitate this alert protocol by enabling the device 103 to send notifications, provide real-time location tracking, and even establish a direct link to 911 emergency services, thereby aiding in a swift response. The wearable device 103 may comprise communication modules designed to work independently, meaning the device 103 does not need to rely on an external phone or similar device to function. In terms of alternatives to this wearable band 103, other forms of wearable technology could potentially be used. These could include devices such as smartwatches, fitness trackers, or even smart clothing equipped with the necessary sensors and communication modules.

The biometric data server 104 may comprise a database that stores both medical and user data for the individual wearing the device 103. The biometric data server 104 may serve an important function in the overall operation of the device 103, acting as a reference point for identifying potential distress situations for the user. The biometric data server 104 may be designed to hold a variety of data types including, but not limited to, medical history, biometric data, and personalized user information. This comprehensive collection of data allows for a robust and personalized monitoring of the wearer. By comparing real-time data collected from the device's sensors to the stored data in the database 104, the system can make informed judgments on whether the user may be experiencing distress. The operation of the database 104 is primarily centered around data comparison. When the wearable device 103 collects real-time data, this information is compared against the pre-stored data in the database 104. If significant deviations are observed in the wearer's vital signs, activity levels, or location data, the system may interpret these as signs of distress. Depending on the severity of the deviations, the system may then trigger an alert protocol, notifying designated responders and providing real-time location tracking to aid in response. Alternatives to this system could include using a cloud-based database for storing the user's data. This would allow for easy access and updating of the data from multiple devices. Another alternative could be using machine learning algorithms to predict distress situations based on the user's historical data, rather than relying solely on real-time data comparison.

The user device(s) 110a may comprise a user's cell phone or electronic communication device that is associated with the wearer of the wearable device 103. This user device(s) 110a may be employed to transmit codes and commands to the wearable device 103. The cell phone or electronic communication device 110a essentially serves as a remote control for the wearable device 103. The user device(s) 110a may be used to lock and unlock the wearable device 103, activate and deactivate the various sensors of the wearable device 103, and initiate the alert protocol when needed. The user device 110a can also be used to customize the settings of the wearable device 103, such as the designated responders for the alert protocol. The communication between the user device(s) 110a and the wearable device 103 occurs wirelessly, through Bluetooth and/or Wi-Fi. Upon receiving a code or command from the user device(s) 110a, the wearable device 103 executes the corresponding action, including, but not limited to locking the band, activating the sensors, or starting the alert protocol. Alternatives to device 110a could include a dedicated remote control device, a computer, or a tablet. These devices could also be used to transmit codes and commands to the wearable device 103 in the same manner as the cell phone or electronic communication device 110a.

The monitoring user device(s) 110b may comprise a user's cell phone or electronic communication device, typically owned by a third party associated with the wearer of the wearable device 103. The electronic device's primary function is to transmit codes and commands to the wearable device 103, ensuring its proper operation and maximizing its utility. The commands and responses form the wearable device 103 mirror that of the user device(s) 110a.

In operation, the cell phone or electronic communication device sends specific codes or instructions to the wearable device. These codes can trigger various functionalities of the wearable device, such as activating certain sensors, initiating emergency protocols, or modifying user settings. The transmission of these codes and commands is typically carried out via wireless communication technologies, such as Bluetooth, Wi-Fi, or cellular networks. The third party, often a healthcare worker or care provider, uses their electronic communication device 110b to monitor and control the wearable device 103 remotely. This allows the third party to respond promptly to any detected emergencies or significant changes in the wearer's condition. As an alternative to using a cell phone or electronic communication device, other forms of electronic devices such as a dedicated remote control, a computer, or a tablet could also be used to transmit codes and commands to the wearable device 103. Another alternative could be setting up an automated system that sends commands based on pre-set conditions or schedules. These alternatives offer different ways of controlling and interacting with the wearable device, depending on the specific needs and circumstances of the user and the third party.

User device(s) 110a or 110b include, generally, a computer or computing device including functionality for communicating (e.g., remotely) over a network 150. Data may be collected from user devices 110, and data requests may be initiated from each user device 110. User device(s) 110 may be a server, a desktop computer, a laptop computer, personal digital assistant (PDA), an in- or out-of-car navigation system, a smart phone or other cellular or mobile phone, or mobile gaming device, among other suitable computing devices. User devices 110 may execute one or more applications, such as a web browser (e.g., Microsoft Windows Internet Explorer, Mozilla Firefox, Apple Safari, Google Chrome, and Opera, etc.), or a dedicated application to submit user data, or to make prediction queries over a network 150.

In particular embodiments, each user device 110 may be an electronic device including hardware, software, or embedded logic components or a combination of two or more such components capable of carrying out the appropriate functions implemented or supported by the user device 110. For example and without limitation, a user device 110 may be a desktop computer system, a notebook computer system, a netbook computer system, a handheld electronic device, or a mobile telephone. The present disclosure contemplates any user device 110. A user device 110 may enable a network user at the user device 110 to access network 150. A user device 110 may enable its user to communicate with other users at other user devices 110.

A user device 110 may have a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user device 110 may enable a user to enter a Uniform Resource Locator (URL) or other address directing the web browser to a server, and the web browser may generate a Hyper Text Transfer Protocol (HTTP) request and communicate the HTTP request to a server. The server may accept the HTTP request and communicate to the user device 110 one or more Hyper Text Markup Language (HTML) files responsive to the HTTP request. The user device 110 may render a web page based on the HTML files from the server for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

The user device 110 may also include an application that is loaded onto the user device 110. The application obtains data from the network 150 and displays it to the user within the application interface.

Exemplary user devices are illustrated in some of the subsequent figures provided herein. This disclosure contemplates any suitable number of user devices, including computing systems taking any suitable physical form. As example and not by way of limitation, computing systems may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computing system may include one or more computer systems; be unitary or distributed; span multiple locations; span multiple machines; or reside in a cloud, which may include one or more cloud components in one or more networks. Where appropriate, one or more computing systems may perform without substantial spatial or temporal limitation one or more steps of one or more methods described or illustrated herein. As an example, and not by way of limitation, one or more computing systems may perform in real time or in batch mode one or more steps of one or more methods described or illustrated herein. One or more computing systems may perform at different times or at different locations one or more steps of one or more methods described or illustrated herein, where appropriate.

The network communication system 111 may comprise modules capable of transmitting information to associated parties. Predominantly, the system 111 utilizes cellular towers to facilitate this transmission of data. The operation of the system involves encoding the information to be sent, transmitting it over the cellular network, and then decoding it at the receiving end to be interpreted by the recipient. The network communication system 111 uses the same infrastructure that supports mobile phone communication. While cellular towers are the primary means of transmission described for the system, alternatives do exist. For instance, the network communication system 111 could alternatively use Wi-Fi networks for data transmission, especially in areas with strong Wi-Fi coverage. Satellite communication could be another alternative for transmitting information, particularly in remote areas where cellular coverage may be sparse. Lastly, the system could employ wired networks for data transmission where the infrastructure allows for it. These alternatives provide options for information transmission under varying conditions and requirements.

Network cloud 150 generally represents a network or collection of networks (such as the Internet or a corporate intranet, or a combination of both) over which the various components illustrated in FIG. 1 (including other components that may be necessary to execute the system described herein, as would be readily understood to a person of ordinary skill in the art) may communicate with each other. In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 150 or a combination of two or more such networks 150. One or more links connect the systems and databases described herein to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable network 150, and any suitable link for connecting the various systems and databases described herein.

The network 150 connects the various systems and computing devices described or referenced herein. In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 421 or a combination of two or more such networks 150. The present disclosure contemplates any suitable network 150.

One or more links couple one or more systems, engines or devices to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable links coupling one or more systems, engines or devices to the network 150.

In particular embodiments, each system or engine may be a unitary server or may be a distributed server spanning multiple computers or multiple datacenters. Systems, engines, or modules may be of various types, such as, for example and without limitation, web server, news server, mail server, message server, advertising server, file server, application server, exchange server, database server, or proxy server. In particular embodiments, each system, engine or module may include hardware, software, or embedded logic components or a combination of two or more such components for carrying out the appropriate functionalities implemented or supported by their respective servers. For example, a web server is generally capable of hosting websites containing web pages or particular elements of web pages. More specifically, a web server may host HTML files or other file types, or may dynamically create or constitute files upon a request, and communicate them to client/user devices or other devices in response to HTTP or other requests from client devices or other devices. A mail server is generally capable of providing electronic mail services to various client devices or other devices. A database server is generally capable of providing an interface for managing data stored in one or more data stores.

In particular embodiments, one or more data storages may be communicatively linked to one or more servers via one or more links. In particular embodiments, data storages may be used to store various types of information. In particular embodiments, the information stored in data storages may be organized according to specific data structures. In particular embodiments, each data storage may be a relational database. Particular embodiments may provide interfaces that enable servers or clients to manage, e.g., retrieve, modify, add, or delete, the information stored in data storage.

The system may also contain other subsystems and databases, which are not illustrated in FIG. 1, but would be readily apparent to a person of ordinary skill in the art. For example, the system may include databases for storing data, storing features, storing outcomes (training sets), and storing models. Other databases and systems may be added or subtracted, as would be readily understood by a person of ordinary skill in the art, without departing from the scope of the invention.

Figure 2:
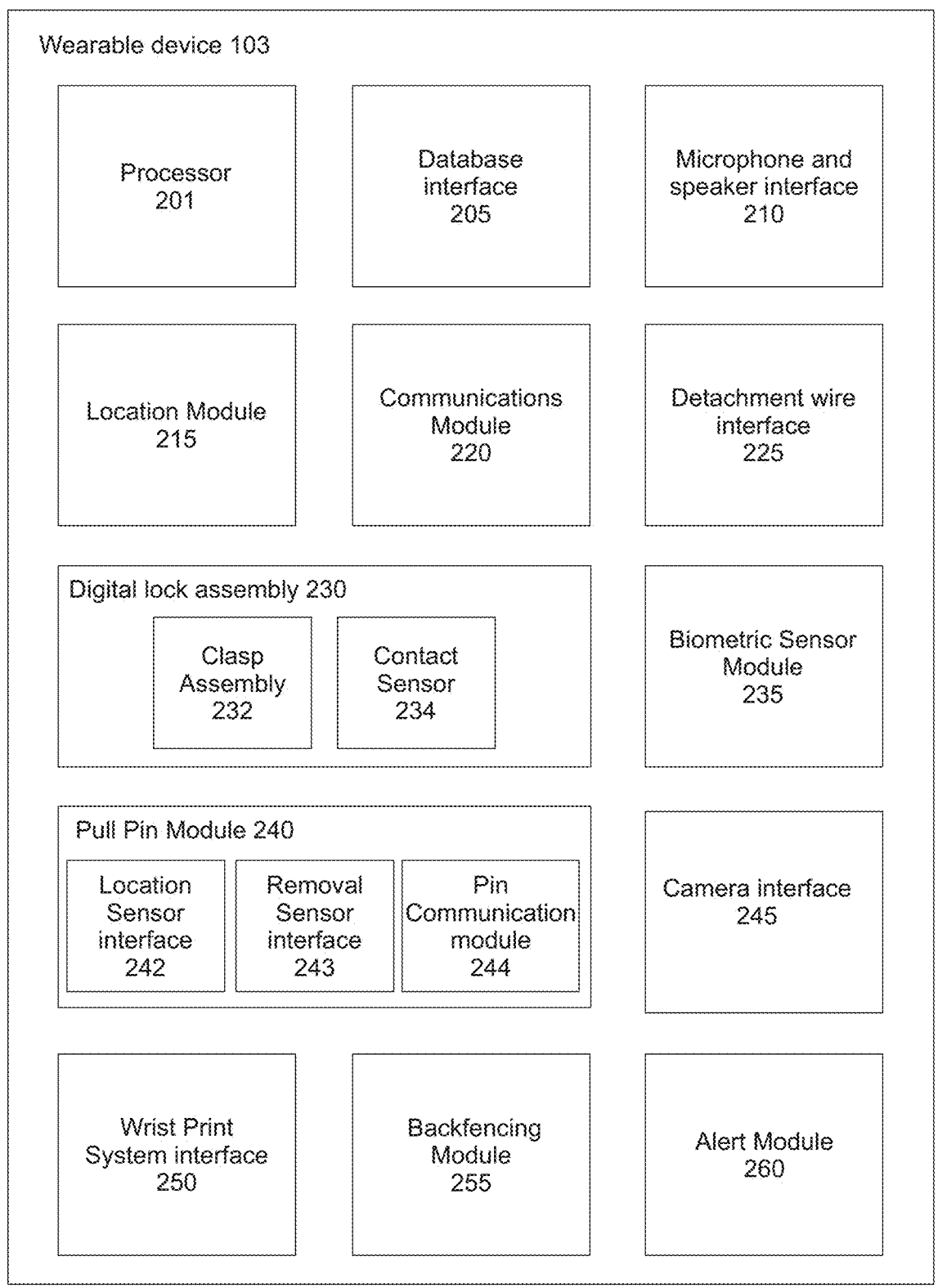
FIG. 2 illustrates a system for the wearable device for improving personal security in accordance with an exemplary embodiment of the present invention.

FIG. 2 illustrates an exemplary embodiment of the monitoring system comprising the wearable device 103. The wearable device 103 includes processor 201, database interface 205, microphone and speaker interface 210, location module 215, communications module 220, detachment wire interface 225, digital lock assembly 230, clasp assembly 232, contact sensor 234, biometric sensor module 235, pull pin module 240, location sensor interface 242, removal sensor interface 243, pin communication module 244, camera interface 245, wrist print system interface 250, back fencing module 255 and alert module 260. The various components described herein are exemplary and for illustration purposes only and any combination or subcombination of the various components may be used as would be apparent to one of ordinary skill in the art. Other systems, interfaces, modules, engines, databases, and the like, may be used, as would be readily understood by a person of ordinary skill in the art, without departing from the scope of the invention. Any system, interface, module, engine, database, and the like may be divided into a plurality of such elements for achieving the same function without departing from the scope of the invention. Any system, interface, module, engine, database, and the like may be combined or consolidated into fewer of such elements for achieving the same function without departing from the scope of the invention. All functions of the components discussed herein may be initiated manually or may be automatically initiated when the criteria necessary to trigger action have been met.

The processor 201 may comprise the central computing unit that manages the flow of data within the system. The processor 201 may handle the incoming data from the sensors and manage the output of data to various components of the wearable device 103. When the sensors detect information such as vital signs, activity levels, and location, the data is sent to the processor 201. These inputs are analyzed in real-time to detect patterns indicative of an emergency situation. The processor 201 may control the output of data by initiating the alert protocol and sending notifications to designated responders in case of emergency situations. The processor 201 may comprise other types of microcontrollers or microprocessors could be used to perform the same function within the wearable device 103. The choice of processor can vary based on factors such as power consumption, processing speed, size, and cost. The specific type of processor used can be chosen to optimize the performance and efficiency of the wearable device 103.

The database interface 205 comprises a link between the device 103 and a biometric data server 104. The database interface 205 may facilitate the processor 201 to juxtapose real-time sensor data with stored variable health data. The database interface 205 serves as a conduit for the real-time sensor data captured by the wearable device 103. The data is transmitted to the biometric data server 104, where it is compared with variable health data that has been previously stored. This comparison allows for real-time health monitoring and can highlight any discrepancies between the wearer's current vital signs and their typical health data. The database interface 205 may function by continually transmitting sensor data from the wearable device 103 to the biometric data server 104. The server 104 then cross-references this data with the stored health data. The processor 201 can identify any significant deviations from the norm, potentially signifying a health issue or emergency situation. The database interface 205 may utilize various methods for data transmission including but not limited to, standard wireless communication protocols such as Wi-Fi or Bluetooth. Alternatively, for devices not in the range of a Wi-Fi network or paired Bluetooth device, cellular data transmission could be employed. The database interface 205 may leverage near-field communication (NFC) if the wearable device 103 and the server 104 are in close proximity.

The microphone and speaker interface 210 may comprise an interface for managing audio data within the wearable device 103. The microphone and speaker interface 210 may be responsible for receiving audio input through an incorporated microphone and delivering audio messages via an inbuilt speaker. The microphone and speaker interface 210 may listen for specific codewords using the microphone. When these codewords are detected in the surrounding audio, the system may trigger an alert. This can be particularly useful in cases where the wearer is in distress and speaks the codeword to activate the device's emergency protocols, The microphone and speaker interface 210 may rely on continuous audio data input from the microphone. The microphone and speaker interface 210 may utilize advanced speech recognition algorithms to sift through the audio data and identify the specified codewords. Once a codeword is identified, the microphone and speaker interface 210 may activate the pre-configured alert response, which may involve sending an emergency message or activating other safety features of the wearable device 103. The microphone and speaker interface 210 may be programmed to identify other types of audio cues such as increased volume or stressed speech patterns, which might indicate a user in distress. Alternatively, the microphone and speaker interface 210 may utilize multiple microphones or more advanced speakers to improve audio input and output quality. The microphone and speaker interface 210 may be integrated with other features of the wearable device, like a panic button or location tracker, to provide a more comprehensive safety response when a codeword is detected.

The location module 215 may comprise an interface designed to receive location information regarding the position of the wearable device 103. The location module 215 may serve as the mechanism that collects and processes geographical data to determine the device's exact location. The location module 215 may leverage Global Positioning System (GPS) technology. The location module 215 may communicate with satellites to triangulate the device's precise coordinates. The location module 215 may constantly update this data to account for the mobility of the wearer, rendering real-time location tracking. The operation of the location module 215 may be largely automatic and requires minimal intervention from the user. The location module 215 may start functioning as soon as the wearable device is activated and/or locked, and continues to work in the background, continually updating location information. The location module 215 may use cellular triangulation, which determines location based on the signal strength from different cell towers. Additionally, Wi-Fi positioning systems could be used to estimate the location based on the proximity to known Wi-Fi networks. These alternative methods can provide location information in scenarios where GPS signals might be weak or blocked, such as indoors or in urban areas with tall buildings.

The communications module 220 may comprise an interface for sending messages via wireless communication to either user devices 110 or emergency services. The communications module 220 may be important to the overall functionality of the device, specifically in the context of emergency situations where immediate action is required. The communications module 220 may function by transmitting crucial data and alerts through established wireless communication protocols. These messages can include, but are not limited to, immediate distress signals, real-time location data, or vital health information. The messages are directed towards user devices 110, such as smartphones or tablets, or directly to emergency services, depending on the severity of the situation and the settings specified by the user. Once an emergency situation is detected by the device's sensors and onboard processors, the communications module 220 may be triggered to send the appropriate messages. The wireless communication protocols used can range from Wi-Fi and Bluetooth to cellular networks, depending on the availability and range of these services. The communications module 220 may choose the most efficient and reliable communication protocol available at any given moment to ensure the successful transmission of messages. The communications module 220 may use satellite communication systems for message transmission, which could potentially provide wider coverage but might also increase the cost and complexity of the device 103.

The detachment wire interface 225 may detect if the band 103 has been cut or tampered with. The detachment wire interface 225 serves an important role in maintaining the integrity of the device 103 and ensuring its continuous operation. The detachment wire interface 225 may continuously monitor the physical state of the band 103. It achieves this through the use of embedded sensors within the band material that can detect changes in the band's continuity. When the band is whole, the sensors relay a specific signal to the interface. If the band is cut or altered, this signal changes, triggering the interface to recognize that the band has been compromised. Upon detection of such a scenario, the interface can trigger a specific response, such as sending an alert or activating a backup locking mechanism, to ensure the device's functionality is not compromised and the user's safety remains a priority. As for alternatives, several different mechanisms could be employed to achieve the same goal. For example, instead of sensors embedded within the band, a thin conductive wire could be incorporated into the band's design. If the band is cut, this would interrupt the electrical circuit and signal that the band has been tampered with. Another alternative could be the use of a pressure-sensitive layer within the band that could detect changes in pressure or tension, indicating that the band has been cut or tampered with. This could provide similar functionality to the described interface, offering additional or alternative means to ensure the security and integrity of the device.

The digital lock assembly 230 comprises an interface that interacts with a pressure sensor and a wire. This subsystem plays a central role in determining the position of the contact sensors 234, specifically, whether they are in a locked position or not. The subsystem's primary function is to control the contact sensors 234. It does this by continuously communicating with the pressure sensor and wire, receiving inputs from them and sending commands as necessary. When the contact sensors 234 are moved into a locked position, this change in state triggers the pressure sensor. The pressure sensor then sends a signal to the interface, which interprets this signal as an indication that the contact sensors 234 are in a locked position. The interface operates through a series of coded instructions that allow it to interpret signals from the pressure sensor and wire. When these components detect a change in pressure or positioning that corresponds to the contact sensors 234 moving into a locked position, they send a signal to the interface. The interface, having been programmed to understand these signals, then confirms and maintains the contact sensors 234 in the locked position. While this specific system uses a pressure sensor and wire to detect the position of the contact sensors 234, there are alternative methods that could be used. For example, a similar subsystem could use a magnetic sensor to detect when the contact sensors 234 are in a locked position. In such a setup, the contact sensors 234 would be equipped with small magnets, and the magnetic sensor would detect the presence of these magnets when the contact sensors 234 are in a locked position. Another alternative could involve the use of optical sensors, which would detect changes in light conditions that occur when the contact sensors 234 move into a locked position.

The clasp assembly 232 functions as a monitoring mechanism for the clasp of the band. It is designed to efficiently and accurately determine if the clasp of the band is in a closed or open position, thereby ensuring the secure attachment of the band to the user's wrist. The clasp assembly 232 may operate by continuously monitoring the physical state of the band's clasp using a series of integrated sensors. These sensors detect any changes in the position of the clasp, whether it is completely closed, partially open, or entirely open. This information is then relayed to the device's onboard processors 201 for further analysis and possible initiation of an alert protocol if the band is detected to be in an open position without authorized detachment. The sensors are strategically positioned to detect changes in the clasp's position based on the physical contact points of the clasp. When the clasp is closed, the sensors register a specific contact point. Any deviation from this contact point is registered as a change in the clasp's position. In terms of alternatives, other types of sensors such as pressure sensors, optical sensors, gyroscopes, or capacitive sensors could also be used to monitor the clasp's position. These sensors can offer different advantages in terms of sensitivity, accuracy, or energy consumption, and could potentially be used in conjunction with or as an alternative to the current sensor setup based on specific design requirements or user needs.

The contact sensor 234 may comprise an interface designed to interpret signals from and manage the contact sensors embedded in the wearable security band. This interface is important to the function and operation of the band's locking mechanism. The subsystem operates by actively reading signals from the contact sensors 234, which are strategically placed within the band. The primary function of these contact sensors 234 is to detect the presence or absence of pressure, associated with the band being worn or removed from the user's wrist. The interface controls the position of the contact sensors 234 in direct response to the signals received from a pressure sensor within the band. When a user inputs a locking code, the subsystem may trigger the contact sensors 234 to move into a locked position. This locked position helps to secure the band on the user's wrist and causes activation of the health and security monitoring features of the device 103. Conversely, when the pressure sensor indicates a lack of pressure, suggesting that the band has been removed from the wrist, the interface commands the contact sensors 234 to move into an unlocked position. This movement effectively deactivates the monitoring features of the device, conserving battery life and ensuring privacy when the device 103 is not in use. While the described subsystem uses pressure and contact sensors, alternatives could include capacitive sensors or optical sensors that detect changes in light due to the band being worn or removed. The interface could potentially also control other types of locking mechanisms based on different physical parameters such as temperature changes or electrical conductivity of the skin.

The biometric sensor module 235 may comprise a receiver of information from biometric sensors that are integrated into the wearable device 103. Its primary function is to collect and interpret data from these sensors, which may include a heart rate sensor and a body temperature sensor. In operation, the module 235 continually receives biometric data that is recorded by the sensors in real-time. This data is then processed by the module 235 to be interpreted or further relayed to other components of the device for appropriate action. For example, if the heart rate sensor detects an unusually high heart rate, this information is passed onto the module 235. The module 235 can then process this information and, if necessary, trigger a response such as activating an alert system. As for alternatives, various other types of biometric sensors could be utilized in conjunction with the module 235. These may include sensors for measuring blood oxygen levels, blood pressure, or even galvanic skin response. The choice of sensor would depend on the specific application and intended use of the wearable device. Regardless of the sensor type, the module 235 would still serve its primary function of receiving and processing the sensor data. The biometric sensor module 235 may also be utilized to detect erratic movement. This erratic movement and consecutive slamming recognition may utilize accelerometer data, pressure sensor data, and/or biometric signals such as heart rate and core body temperature to detect potential emergencies. The erratic movement sensor may monitor for three or more consecutive slams on a hard surface, extended periods of erratic motion, elevated pulse, and abnormal body temperature, triggering alerts to co-guardians and the guardian center for immediate assistance. Additionally, the biometric sensor module may utilize a SMR (Sleeping-Movement-Rest) Radius Detection and Identification system in conjunction with location module 215 to map rest locations within a home, such as couches, chairs, and beds, and monitor user activity relative to these identified areas. The biometric sensor module 235 may detect potential falls or unconsciousness through prolonged periods of low heart rate, reduced body temperature, unresponsiveness to vibrational alerts, and lack of movement. If the individual is located outside the designated rest areas or shows signs of distress, the system promptly alerts the security network, enhancing the ability to respond to critical situations effectively.

The pull pin module 240 may comprise a help pull-pin chip integrated into the band of a wearable security device. This pull-pin chip is activated by applying equal pressure to the thumbnail or raised texture of the band apparatus, employing an upward motion that detaches it from the wearable band apparatus. Functionally, the pull-pin chip serves a dual purpose. Upon activation, it initiates GPS technology to track the user's location while also sending a sensor alert to public safety for immediate dispatch to the user's real-time location. This simultaneous action of tracking and alerting public safety is crucial for timely response in emergency situations. The pull-pin chip is designed to be detached from the wearable security device, enabling the user to utilize an adhesive film and discreetly locate the help pull-pin chip in areas such as behind the ear, the sole of the shoe, or the interior of a pocket. This feature allows for continued tracking even if the wearable device 103 has been removed, enhancing user safety. In addition to the location tracking and alert features, the detachment of the help pull-pin chip triggers additional actions. An alert is sent to the registered caregivers notifying them that the help pull-pin chip has been activated. Simultaneously, an embedded recording camera is exposed and begins recording the unfolding events in real-time, providing audio-visual evidence of the situation. Alternative designs for the pull-pin chip could include different activation mechanisms, such as a button or switch, or different form factors that could be hidden in everyday objects for increased discretion. The pull-pin chip could also be integrated with other types of technology for additional functionality, such as biometric sensors or communication devices.

The location sensor interface 242 may comprise location tracking, utilizing sensors similar to Global Positioning System (GPS) technology. The primary function of this subsystem is to accurately determine and monitor the geographical location of the pull pin module 240. It activates when the pull pin module is removed from the band, indicating a potential emergency situation. The location sensor 242 then begins tracking the pull pin chip's current position, updating this information in real time for accurate and up-to-date data. In terms of operation, the location sensor 242 works by receiving signals from a network of satellites as used in traditional GPS systems. The sensor analyzes these signals to calculate the device's precise geographical location. This information is then relayed back to the main system, allowing for real-time tracking of the wearer's position. There are alternative technologies that can be utilized for the location sensor within the pull pin module subsystem 240. For instance, it could employ cell tower triangulation, which uses the distance from multiple cell towers to determine location, or WiFi positioning systems that use the proximity to known WiFi networks for location tracking. These alternatives provide flexibility in design and can offer location tracking capabilities in areas where GPS signals may be weak or unavailable.

The removal sensor interface 243 may comprise a component of the pull pin module 240 found in the wearable security device. This subsystem 243 is designed to sense the removal of the pull pin and respond accordingly. This subsystem plays an important role in the functionality of the device, specifically in triggering an alert protocol. When the pull pin is removed, it detects this action and initiates a command to send out an alert. This alert can notify designated responders that the user might be in an emergency situation, thereby facilitating a swift response to the user's location. The working principle of this subsystem relies on sensor technology. The subsystem is equipped with sensors that can detect physical changes related to the pull pin. When the pull pin is in place, the sensor maintains a neutral state. However, when the pull pin is removed, the change in physical state is detected by the sensors 243, which then send a signal to the onboard processors, initiating the alert command. Furthermore, the subsystem can also prompt the activation of the device's recording features. Upon detection of the pull pin's removal, it may send a signal to activate the microphone and camera on the device. This allows for audio-visual data to be recorded and possibly transmitted, providing additional information about the emergency situation. As for alternatives, other types of sensors or switches could be used to detect the removal of the pull pin. For instance, a mechanical switch could be used where the removal of the pull pin changes the state of the switch, triggering the alert. Another alternative could be the use of magnetic sensors, where the pull pin removal disrupts a magnetic field, causing the alert to be triggered.

The pin communication module 244 may comprise a subsystem of the wrist-worn security device 103. This subsystem 244 is designed to enhance the device's emergency response capabilities by enabling direct communication with emergency services. The pull pin module 240 functions as a trigger for the device's emergency alert protocol. When activated, typically by the user in a distress situation, it sends a signal to the device's processors. The processors then initiate an alert protocol which includes sending information and real-time location data to emergency services. The operational mechanism of the pull pin module involves a physical pull pin integrated into the band of the device. When the pin is pulled, it disrupts a circuit within the module which triggers the alert protocol. This is a simple and reliable mechanism that requires minimal power and can be activated quickly and discreetly in an emergency situation. As an alternative to the physical pull pin, other forms of user-activated triggers could be used. For instance, a pressure-sensitive button or a touch-sensitive interface could be integrated into the band. Similarly, a voice-activated trigger could be used, wherein a specific distress word or phrase spoken by the user could activate the alert protocol. Another alternative could be a biometric trigger, such as a sudden increase in the user's heart rate or a specific pattern of movements detected by the device's motion sensors. These alternatives provide flexibility in the design of the device and can be selected based on user preferences and specific use-case requirements.

The camera interface 245 may comprise an interface for receiving video data and sending messages. The subsystem performs two primary functions. First, it receives video data from the camera embedded in the wearable device. This video data is crucial for providing real-time visual information, enabling monitoring of the user's environment which could be vital in emergency situations. Second, the subsystem also facilitates communication by sending messages through the communication interfaces of the wearable device. These messages could be alerts or notifications sent to designated recipients, such as emergency services or specified contacts, in response to certain trigger events detected by the device. In terms of operation, the subsystem works by continuously interfacing with the camera on the wearable device, receiving real-time video data. This data is processed and stored for immediate or future use, depending on the design and function of the device. Concurrently, the subsystem also interacts with the communication interfaces of the device to send messages. The messages sent could be automatic responses triggered by certain events or manual messages input by the user. As for alternatives, the subsystem could be designed to interface with other data capturing components, such as microphones for audio data. The subsystem could also be integrated with additional communication interfaces to send messages across different communication channels such as SMS, email, or push notifications on paired devices.

The wrist print system interface 250 may comprise a sophisticated biometric subsystem incorporated into the wearable security device 103. It is designed to identify unique biological characteristics of an individual's wrist, including vein dimensions, wrist width, pronounced fingerprint lines, skin hue, and base hand imprints, among other attributes. The function of this subsystem 250 is to ensure the wrist identification of the registered user at the onset of the wireless digital lock being engaged, and at various unannounced times throughout the day. It is also activated automatically upon any level of distress signalization. This technology thereby adds an additional layer of security and ensures that the band is being worn by the registered user. The wrist imprint scan technology works by employing an encrypted wrist scan with a reverse light scan cycle. This scan records the wrist's biological factors across the entire width of a clear glass window on the band apparatus. The light reflected on the clear recording mechanism is then turned into a photo and/or video snapshot. This snapshot is uploaded to the network, where it is compared to the registered user's information to determine a match. In the event that the wrist scan identifies an unidentified band user or a different wrist, an alert is sent to a caregiver and a distress signal is triggered. This ensures that the device is being used properly and provides a rapid response to potential unauthorized use. As an alternative, other biometric technologies could potentially be used for user identification. For instance, technologies measuring heart rate patterns, skin conductivity, or other unique physiological characteristics could be explored as alternatives or supplements to the wrist imprint scan technology.

The back fencing module 255 is designed to support the alarm module by defining specific areas through a process known as "fencing". This process essentially creates virtual boundaries or zones within a given space, which can guide the behavior of the alarm module. The subsystem works by using geofencing technology. Geofencing is a location-based service in which an app or other software uses GPS, RFID, Wi-Fi, or cellular data to trigger a pre-programmed action when a mobile device or RFID tag enters or exits a virtual boundary set up around a geographical location, known as a geofence. In this case, the geofence is set up around a designated area, and when the alarm module breaches this fence, it triggers a specific behavior or response. The operations of this subsystem involve the use of complex algorithms and location-based data to set up the virtual fences. Once these fences are established, the subsystem communicates with the alarm module, providing it with the necessary information about its boundaries and the associated behavior when these boundaries are crossed. There are several alternative methods that could be used to achieve the same or similar outcomes. For instance, proximity sensors could be used to detect the presence of the alarm module within a certain range. Alternatively, a system of physical markers or beacons could be used in conjunction with a sensor on the alarm module, triggering a response when the module comes into contact with or close proximity to these markers. However, these alternatives may not offer the same level of flexibility and adaptability as the geofencing approach used in this subsystem.

The alert module 260 may comprise a subsystem described as an alarm module integrated within the wearable device 103. This module 260 is designed to send out alarms under certain conditions, indicated by changes in state status or the readings from the contact sensor. The alarm module operates by initiating data connections with various sensors housed within the wearable device 103, including image and audio sensors. Upon activation, it is capable of transmitting image data captured by the camera interface 245, as well as location data related to the wearable band and the removable chip located on the band. The alarm module's functionality extends to initiating communication with a third device, enabling it to send SMS and/or MMS alerts to a user device 110 or directly to emergency services. It can also transmit an audio signal to a speaker associated with the wearable device 103, providing an audible alarm in addition to the digital alerts. This alarm module 260 also features a hierarchy of alarms that are triggered based on time and sensor data. This means that the severity or urgency of the alarm can escalate over time or depending on the data received from the device's sensors. Alternatives to this alarm module could include standalone devices dedicated solely to alarm functionality, or a structure where alarms are directly controlled by individual sensors rather than a centralized module. Another alternative could involve using different communication protocols for sending alerts, or varying the types of sensors used to trigger the alarms.

Processes for Monitoring

Figure 3A:
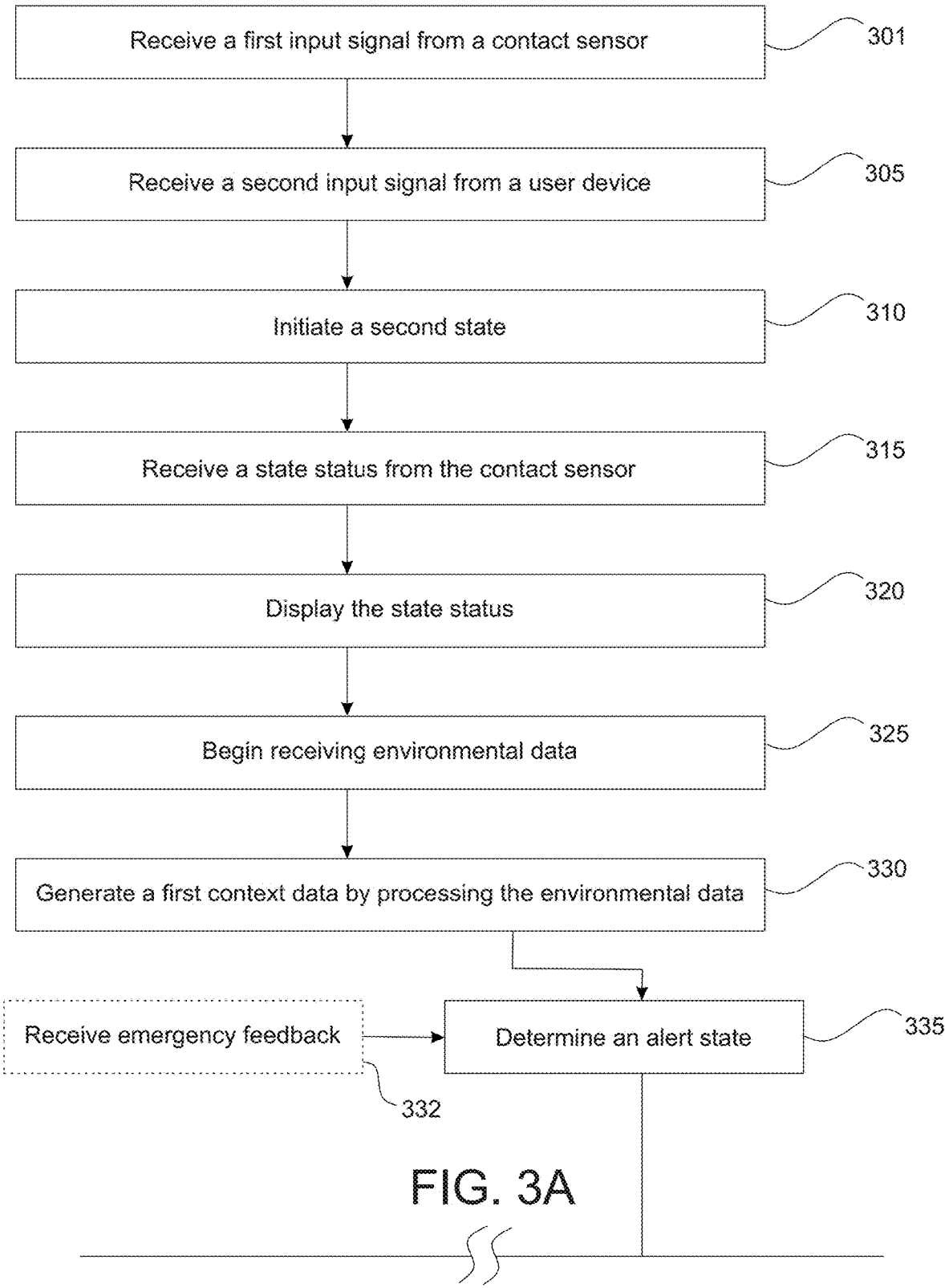
FIGS. 3A and 3B illustrates an exemplary process for using a wearable device to improve personal security according to one embodiment of the invention.
Figure 3B:
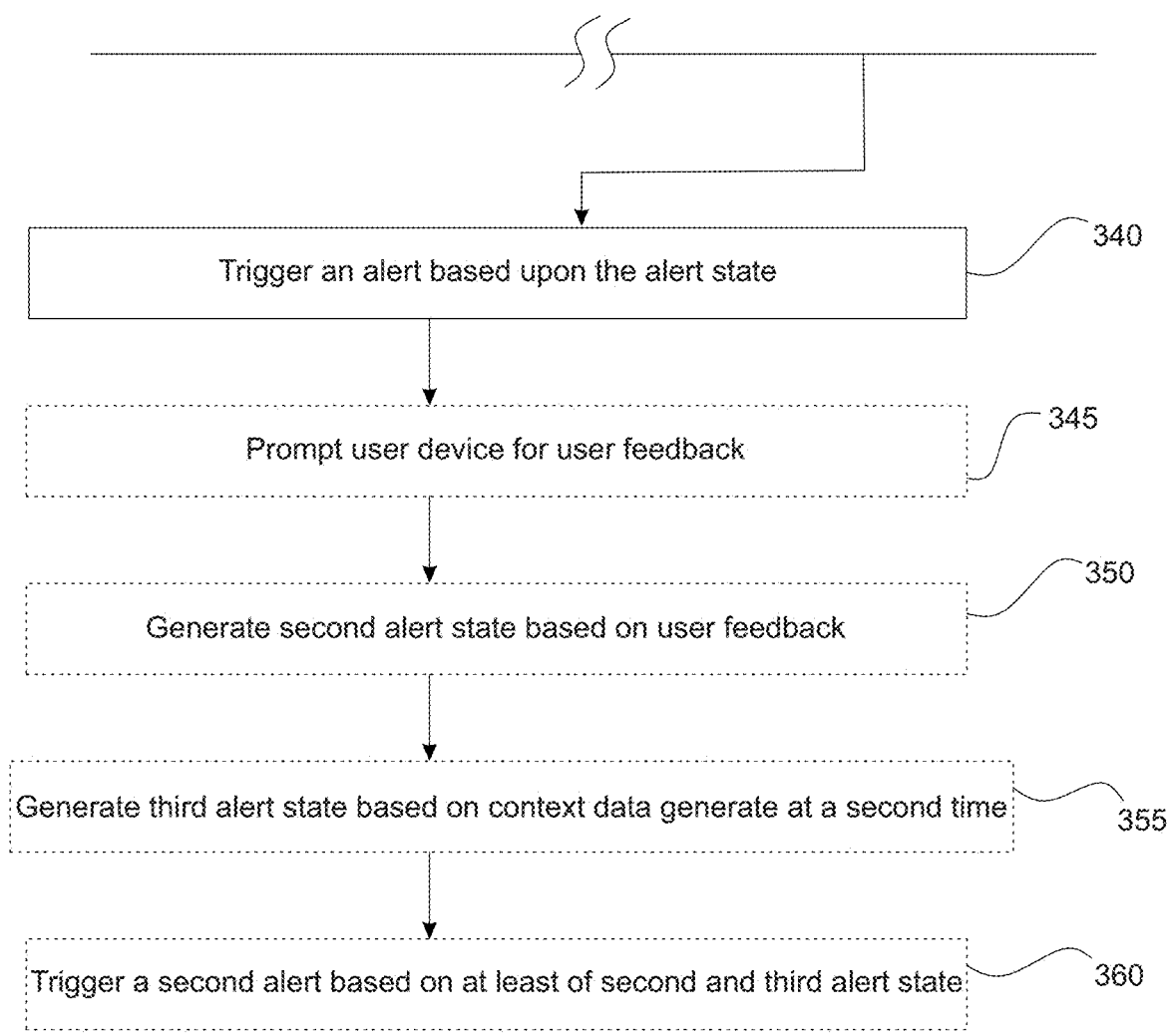

FIGS. 3A and 3B illustrate an exemplary process for monitoring according to one embodiment of the invention. The process steps described herein may be performed in association with a system such as that described in FIG. 1 and/or FIG. 2 above or in association with a different system. The process may comprise additional steps, fewer steps, and/or a different order of steps without departing from the scope of the invention as would be apparent to one of ordinary skill in the art.

At 301—receive a first input signal from a contact sensor, the software process begins with the transmission of an input signal designed to verify the correct positioning of the contact sensor on the wearable device. This step ensures the device is aligned correctly, allowing the digital locking mechanism to function appropriately. If the device is found to be improperly positioned, the software process initiates a corrective action, resulting in the contact sensors moving to an unlocked position. Step 301 may use algorithms to interpret the input signal and determine the positioning of the device. If the device is not properly positioned, the software triggers an actuator that moves the contact sensors to an unlocked position, signaling the user to adjust the position of the wearable device. Alternative methods for this software process may involve using different types of sensors or input signals, such as infrared or ultrasonic sensors, to detect the position of the device. Furthermore, the step may be designed to provide different types of alerts, such as visual or auditory signals, to notify the user when the device is not correctly positioned.

At 305—receive a second input signal from a user device, a transmission of a signal is made from either the wearer's device or a designated associated user's device to the wearable device. This signal instructs the wearable device to enter a locked state. The signal may be sent from the wearer's device, or alternatively, it can be transmitted from another user's device that is involved in managing the wearable device. Such associated users might include professional caregivers, parents, or healthcare providers. Alternatively, the initiation could also be automated based on certain conditions or triggers, such as a specific time, a geographic location, or a detected change in the wearer's vital signs. Step 305 may involve sending a signal to the user device to not only lock but also to perform other actions such as activating an alarm, sending a notification to the associated user, or initiating a call to emergency services. Another alternative could involve the use of biometric data, such as a fingerprint or a retina scan, for unlocking or locking the user device. A further alternative could involve the use of encryption for enhanced security, wherein the signal sent to the wearable device to lock is encrypted, and only an encrypted signal can unlock the device.

At 310—initiate a second state, the software process alters a digital locking mechanism integrated into the wearable device. This mechanism is designed to secure the wearable device onto the user, such as a band on a wrist, in a manner that is both comfortable and secure. While the wearable device is secure, it may still be manipulated by the user to be removed without digitally unlocking. Step 310 may ensure that the device remains on the user until it is intentionally removed by authorized personnel or by the user themselves. Step 310 may work by activating a secure locking protocol when the device is fastened onto the user. This protocol can be initiated either manually by the user through an interface on the device or automatically by the device once it detects that it has been worn. Once activated, the digital locking mechanism cannot be disengaged without the correct digital authorization, which can include a password, a biometric identifier, or a secure wireless command. Step 310 may control an actuator within the wearable device that physically engages a lock. This lock can take various forms, such as a pin and slot arrangement, a latch, or a series of detents and pawls. The lock may confirm proper positioning through the use of a pressure sensor found on the wearable device. In an alternative to a pressure sensor, a gyroscope may be used in addition to the pressure sensor, as a backup to the pressure sensor or as an alternative. The software continuously monitors the status of the lock and, if an attempt at unauthorized removal is detected, the software may initiate a response that includes, but is not limited to, sounding an alarm, sending a notification, or delivering a mild deterrent stimulus. Alternatives to the digital locking process can include mechanical locking systems that require a physical key or a tool to disengage. However, these systems do not offer the same level of security and convenience as the digital locking process.

At 315—receive a state status from the contact sensor, a signal is received confirming that a wearable device has been digitally locked and positioned properly. This confirmation is based on the reception and analysis of a pressure signal described in the previous steps. Step 315 ensures that the device is securely fastened and activated, which is a prerequisite for the subsequent monitoring and alerting features to function. If the input signals match predefined parameters, the process confirms that the wearable device has been digitally locked and positioned properly. Step 315 may involve requiring a user confirmation input, such as a button press or a digit code, to verify that the device has been properly positioned, locked, and activated.

At 320—display the state status, a non-verbal communication is sent to indicate that a locked state has been set. Step 320 may provide a clear, distinct signal to the user that a specific action, in this case, the activating of a locked state, has been successfully completed. Step 320 may display or send out specific non-verbal cues. These cues are designed to be easily noticeable and distinguishable, ensuring that the user is promptly and properly informed about the status of the locked state. The non-verbal cues employed by the software process can vary and include different forms of sensory feedback. Step 320 may trigger a vibration in the wearable device. This vibration acts as a physical indicator to the user that the locked state has been set. Step 320 may activate a blinking light on the device. This light would serve as a visual cue to the user, signaling the activation of the locked state. Step 320 may employ varying color hues as a non-verbal cue. Step 320 would change the color displayed on the device, with each color representing a different state. This provides the user with an easy-to-understand, visual representation of the state of the device. These non-verbal cues are not mutually exclusive and can be used in combination to provide a more robust and clear communication to the user. Step 320 may activate both a vibration and a color change simultaneously to indicate the locked state. This would provide the user with multiple forms of feedback, increasing the likelihood that the user accurately understands the state of the device. It should also be noted that the specific forms of non-verbal communication described here are only examples. The software process could be designed to utilize other forms of non-verbal communication, depending on the specific requirements and constraints of the device and user interface.

At 325—begin receiving environmental data, an initiation of a data transfer from various sensors located on the wearable device begins. Step 325 may help reduce energy demands on the system by regulating how often the data transfer is activated. This data transfer process involves collecting data from sensors that monitor vital signs, activity levels, and location, among other parameters. These sensors might include, but are not limited to a heart rate monitor, pedometer, GPS, and other sensors known to those skilled in the art. The data collected may provide insights into the wearer's physical state and environment. Once the data is collected, it is packaged into a suitable format for transfer. Step 325 may be programmed to initiate a data transfer only when certain conditions are met, such as when a particular sensor reading exceeds a predetermined threshold. Alternatively, the wearable device could be equipped with local data processing capabilities, allowing for initial analysis of the data to be carried out on the device itself before the results are transferred. This may reduce the volume of data needing to be transferred.

At 330—generate a first context data by processing the environmental data, sensor data is analyzed by the wearable device. The sensor data may include the data collected in the previous step 325. Step 330 may analyze the collected data to understand the current status of the wearer. For example, if the wearer's heart rate and blood pressure suddenly spike while their movement data indicates a lack of activity, the software might interpret this as a potential health emergency. Step 330 may lookout for instances of emergency or health situations. This is achieved through the implementation of predefined rules or machine learning algorithms that can identify patterns indicative of health emergencies. Step 330 may use machine learning algorithms that could be trained on a dataset of health emergencies to improve detection accuracy.

At 332—receive emergency feedback, an optional measure may be used to elevate the level of alert in certain emergency situations. Step 332 may be initiated when a specific set of criteria is met: the removal of a pull pin chip or the transmission of an emergency code. During step 332, when the pull pin chip is removed or an emergency code is sent, the system recognizes these actions as triggers for a potential emergency situation. Upon detection of these triggers, the software initiates a protocol to escalate the alert level. Alternatively, instead of escalating the alert level upon detection of these triggers, the method may initiate other protocols, such as activating a siren or emergency light, locking down the device, or starting a countdown timer for user intervention before escalating the alert.

At 335—determine an alert state, the process sets an alert level by gathering contextual data and any received emergency codes. This contextual data could include a range of factors such as the user's location, activity, vital signs, and any environmental factors such as time of day or weather conditions as gathered from step 330. Step 335 compares the current contextual data and any received emergency codes against predetermined thresholds or patterns that might indicate a potential emergency situation. Following this, the software process makes a determination on what level an alert state should be set at. The alert state can vary in severity, from a low-level alert indicating a potential concern, to a high-level alert indicating a likely emergency situation. Step 335 may set the alert state at the determined level. An alternative to step 335 may involve incorporating machine learning algorithms to improve the accuracy of the alert state determination over time. This alternative process would learn from past data and alert outcomes to refine the thresholds or patterns used to determine the alert state, potentially improving the reliability and effectiveness of the emergency response.

At 340—trigger an alert based upon the alert state, the software process initiates an alert in the wearable or the user devices. Step 340 may enhance user safety by rapidly communicating potential threats or emergencies. The alert can take various forms, based on the specific circumstances and requirements. The alert may comprise changing the state status. This could involve altering the display on the wearable device or user device, such as changing color, flashing, or otherwise visually indicating an alert status. At step 340, the process may change the state of the contact sensor. This may be a physical alteration, such as rotation or vibration. Step 340 may involve sending a message through wireless communication protocols. This could be an automated text message, email, or other form of digital communication sent to the user's device or to a designated emergency contact. Step 340 may initiate a data connection with an image sensor or an audio sensor housed within the wearable device. This connection allows the device to capture and transmit real-time visual or audio data, which can provide additional information about the user's situation. Step 340 may transmit data from the wearable device. This could be image data from an associated image sensor or location data from the wearable band itself or from a removable chip located on the wearable band. Step 340 may initiate communication with a third device to send SMS and/or MMS to a user device or emergency services. This provides another channel of communication and allows for more detailed information to be sent. Step 340 may transmit an audio signal to a speaker associated with the wearable device. This could be an alarm, verbal instructions, or other audible alert. These steps can be modified or substituted based on the specific needs of the user or the capabilities of the wearable device.

At 345—Prompt user device for user feedback, an optional step wherein the user device can request feedback from the user. This feedback may be utilized to either confirm or dismiss the alert state triggered by the system. Upon detection of an event that triggers an alert, the software prompts the user device to seek user feedback. This is typically executed in the form of a notification or a pop-up message on the user device's screen, asking the user to either confirm or dismiss the alert state. The user may interact directly with this notification, allowing for a quick and straightforward method of feedback. Alternatives that can be used for this step could include different methods of seeking user feedback. Step 345 may use an automated phone call or a text message to the user's registered number. The user could then provide feedback by answering the call or replying to the text. Another alternative could be to use an email notification sent to the user's registered email address. The user could then provide feedback by replying to the email.

At 350—generate a second alert state based on user feedback, an optional step where the alert state is modified based on the user's response. Step 350 may operate by receiving and analyzing the user's response once an alert state has been triggered. The user's response may be an acknowledgement of the alert, a dismissal of the alert, or a request for more information. Upon receiving the user's response, step 350 may analyze it to determine the appropriate modification to the alert state. If the user acknowledges the alert as legitimate, the software might escalate the alert state, initiating further actions such as notifying authorities or activating additional security measures. Alternatively, if the user dismisses the alert, indicating it was triggered by non-threatening activity, the software could de-escalate or cancel the alert state. In cases where the user requests more information, the software might maintain the alert state while providing the requested information. The alert state may be modified based on input from other integrated systems, such as security cameras or additional sensors.

At 355—generate a third alert state based on context data generated at a second time, the process involves the generation of an optional alert state. This alert state is generated based on the data collected from various sensors after the initial alert state has been triggered. Step 355 may analyze the gathered sensor data, taking into account factors such as the duration a user has remained in a particular contextual state. If it is determined that the user has remained in a certain contextual state for an extended period, the software may opt to adjust the alert level. This adjustment could involve either raising or lowering the alert state depending on the specific conditions and parameters set within the software. Step 355 may also consider other factors such as user feedback or additional sensor data. Step 355 may also use a different algorithm or method for determining when to raise or lower the alert state. Step 355 may be made non-optional, where the secondary alert state is always generated, or it could be user-configurable, allowing the user to set their own parameters for when the secondary alert state is triggered.

At 360—trigger a second alert based on at least one of second and third alert state, an optional step involves the initiation of a new alert based on the information obtained after a previous alert was triggered. Step 360 may determine that a new alert is warranted, the method triggers this alert and sends it to the appropriate destination. This could be a user interface, a particular individual or group of individuals, or an integrated system that takes further action based on the alert. These alerts may mirror the different alerts as described in step 340. Step 355 may use a tiered or escalated alert system, in which the urgency or severity of the new alert is based not only on the post-alert information but also on the frequency or number of preceding alerts.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments). Any of the above mentioned systems, units, modules, engines, controllers, components or the like may be and/or comprise hardware and/or software as described herein. For example, the monitoring system and subcomponents thereof may be and/or comprise computing hardware and/or software as described herein in association with FIGS. 4-7. Furthermore, any of the above mentioned systems, units, modules, engines, controllers, components, interfaces or the like may use and/or comprise an application programming interface (API) for communicating with other systems units, modules, engines, controllers, components, interfaces or the like for obtaining and/or providing data or information.

Figure 4:
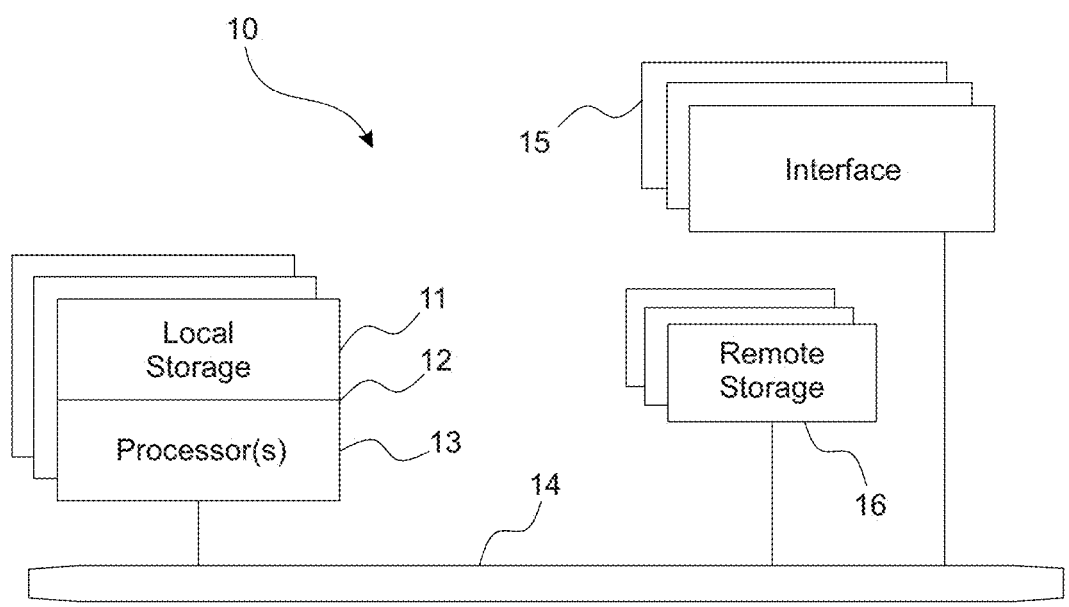
FIG. 4 illustrates one embodiment of the computing architecture that supports an embodiment of the inventive disclosure.

Referring now to FIG. 4, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 4 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 5:
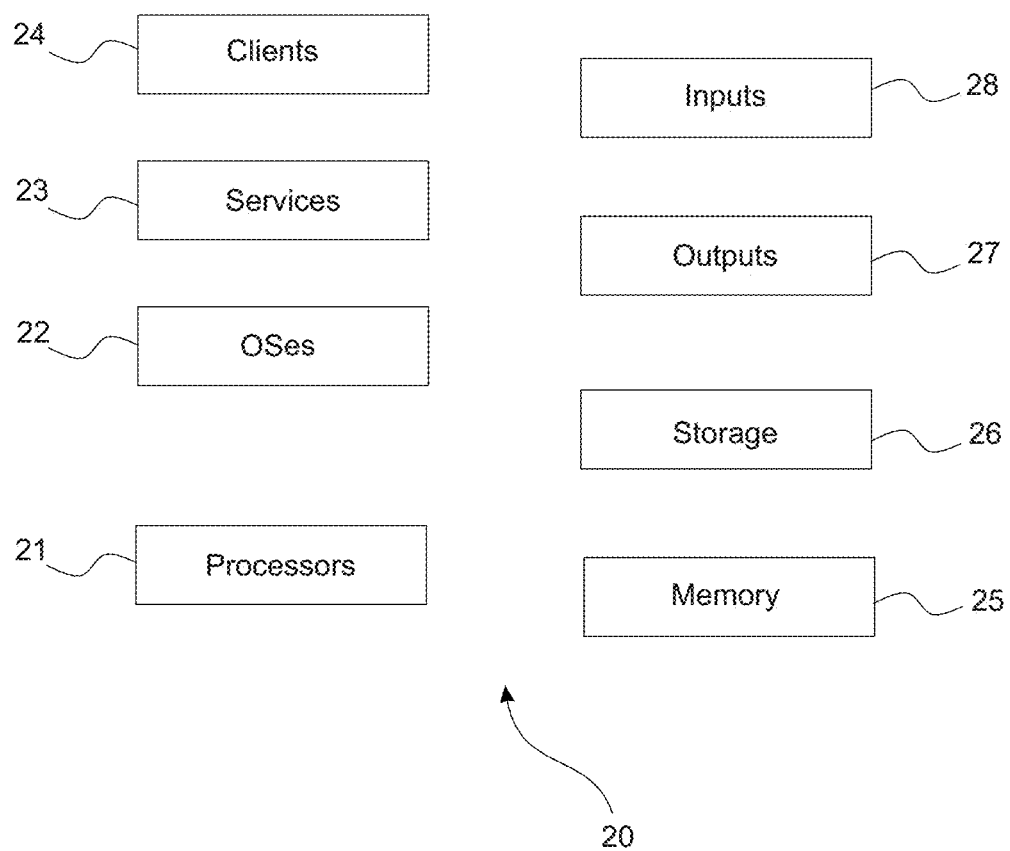
FIG. 5 illustrates components of a system architecture that supports an embodiment of the inventive disclosure.

In some embodiments, systems may be implemented on a standalone computing system. Referring now to FIG. 5, there is shown a block diagram depicting a typical exemplary architecture of one or more embodiments or components thereof on a standalone computing system. Computing device 20 includes processors 21 that may run software that carry out one or more functions or applications of embodiments, such as for example a client application. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 4). Examples of storage devices 26 include flash memory, magnetic hard drive, CD-ROM, and/or the like.

Figure 6:
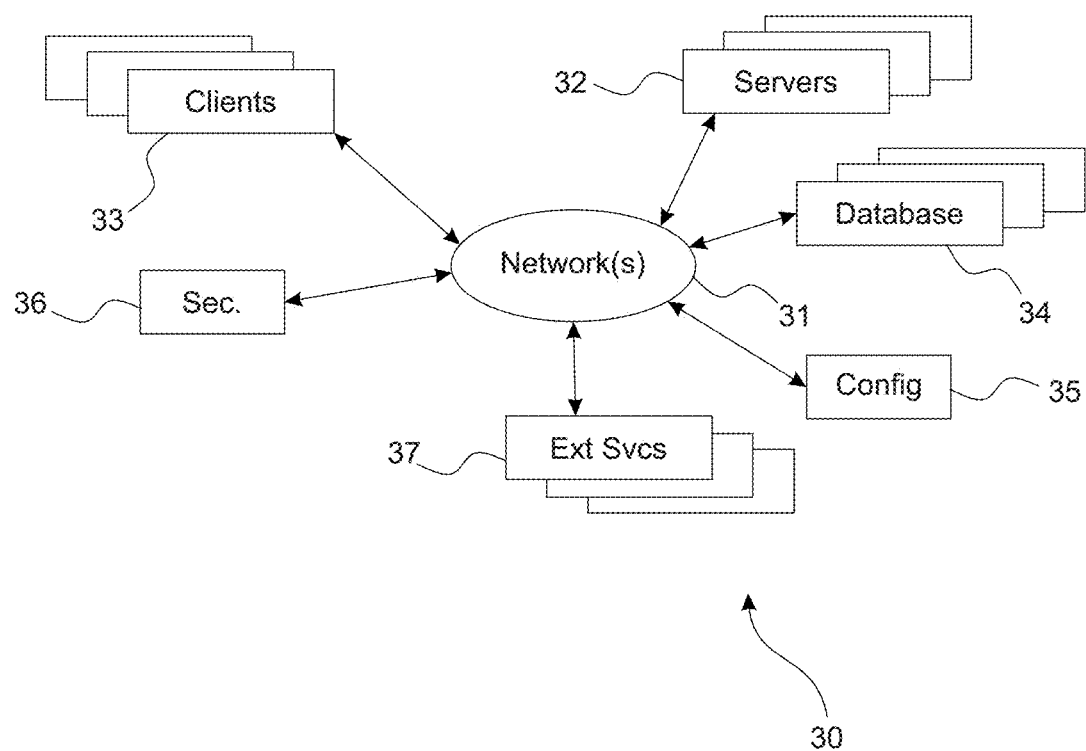
FIG. 6 illustrates components of a computing device that supports an embodiment of the inventive disclosure.

In some embodiments, systems may be implemented on a distributed computing network, such as one having any number of clients and/or servers. Referring now to FIG. 6, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 5. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications are implemented on a smartphone or other electronic device, client applications may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

Figure 7:
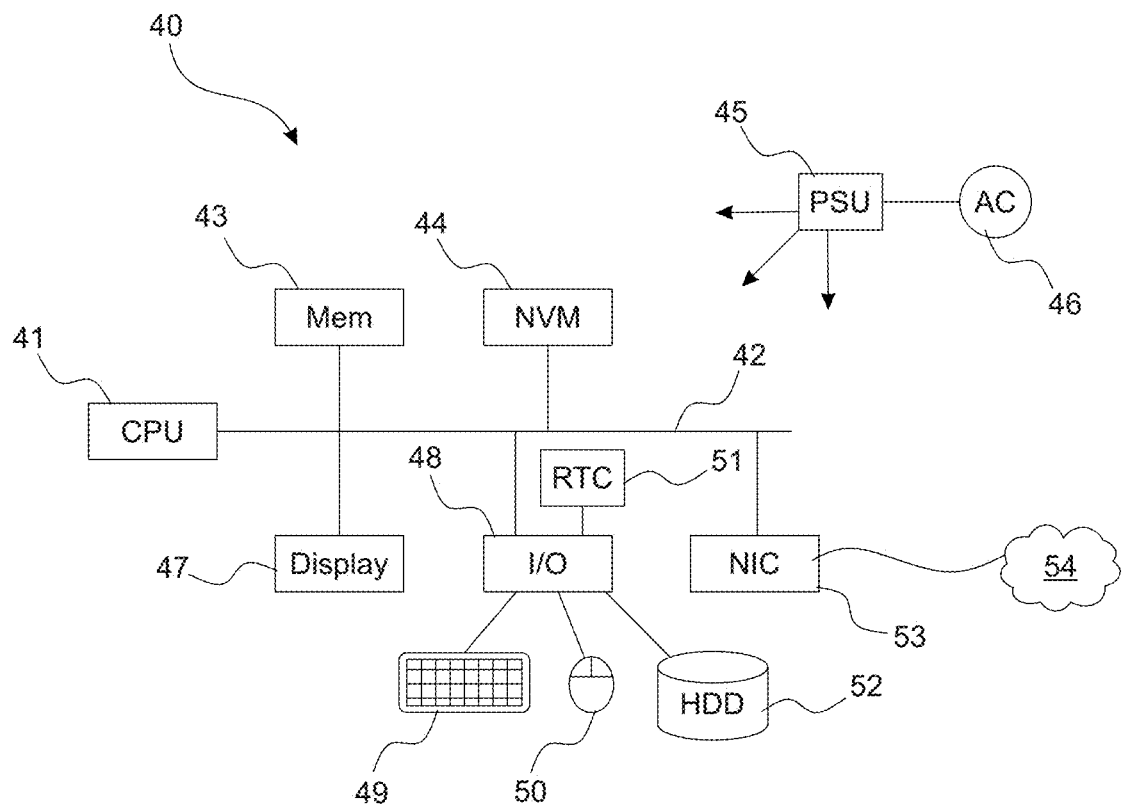
FIG. 7 illustrates components of a computing device that supports an embodiment of the inventive disclosure.

FIG. 7 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

Figure 8A:
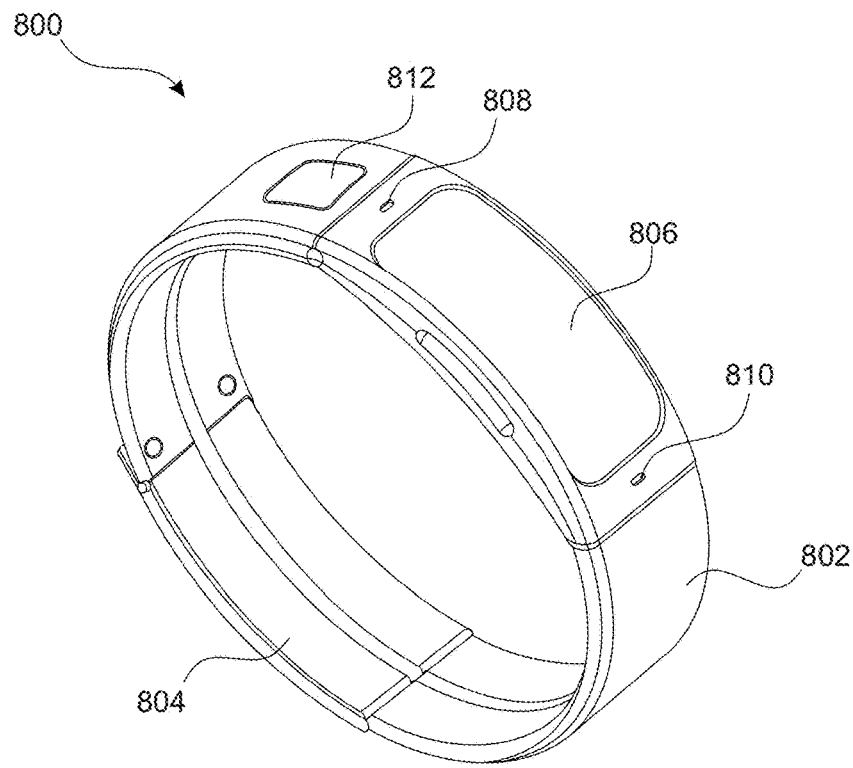
FIGS. 8A, 8B, and 8C are perspective views of the wearable device in a closed position, partially open position, and fully open position, respectively, in accordance with an exemplary embodiment of the invention.

Referring now to FIG. 8A, the wearable device 800 includes a strap 802, a clasp 804, a display 806, a speaker 808, a microphone 810, and a removable chip 812. The strap 802 and the clasp 804 are formed in a continuous piece. The strap 802 may be made of fabric, plastic, metal, or any other material that is water resistant and comfortable to wear for extended periods of time. The strap 802 functions as an outer cover for the internal components of the wearable device 800.

Figure 8B:
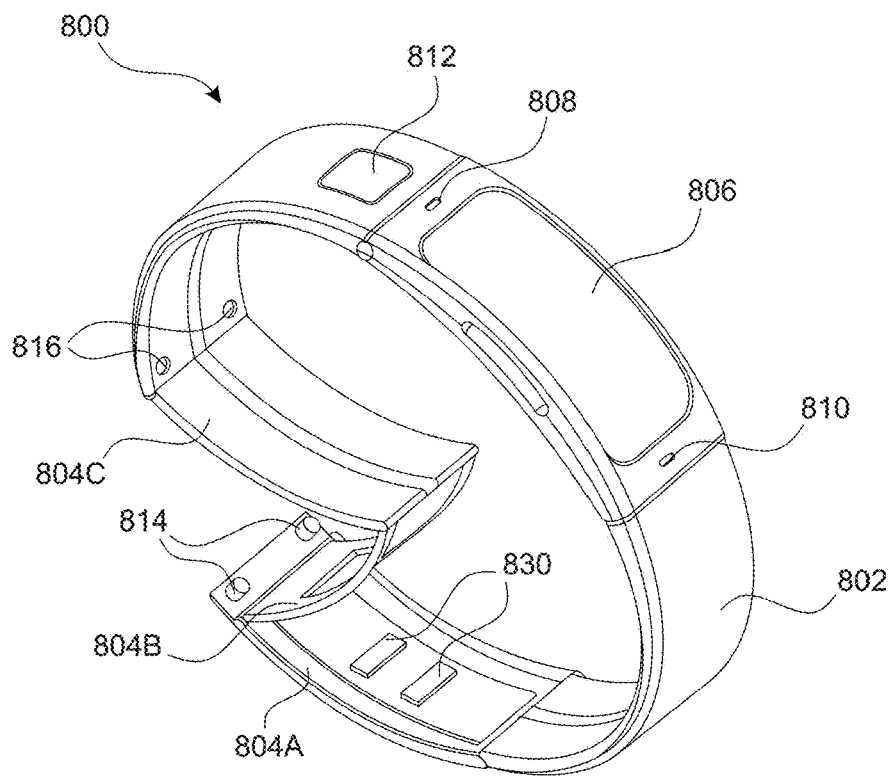
Figure 8C:
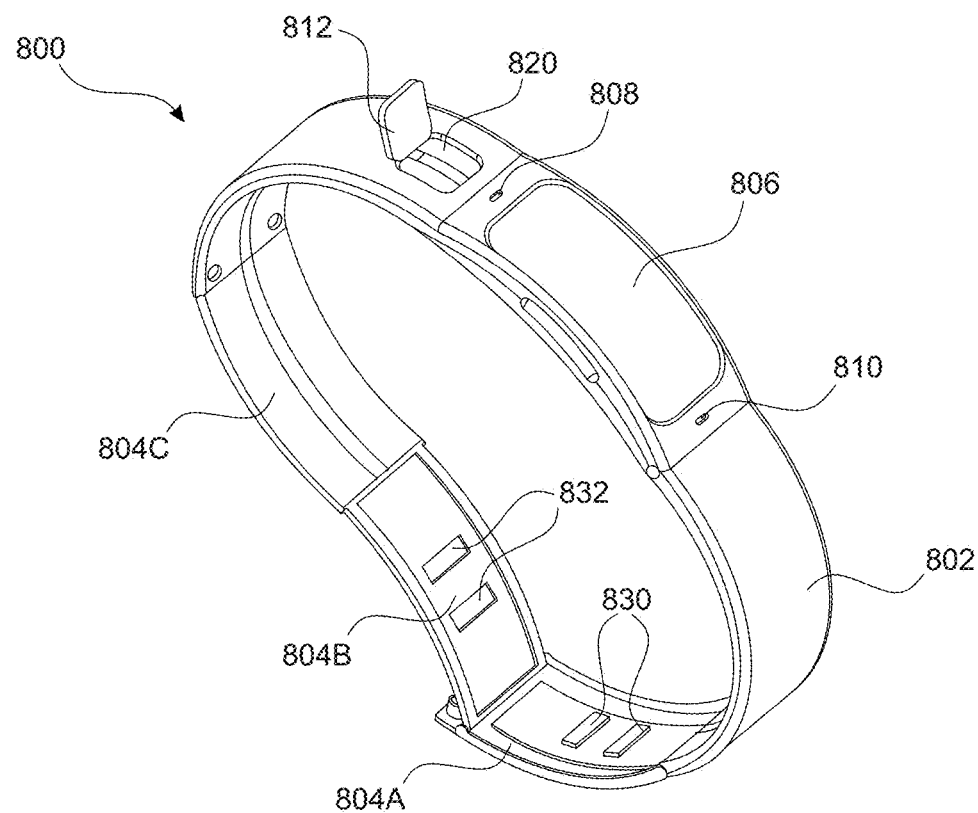

The clasp 804 has a closed position, as shown in FIG. 8A, a partially open position, shown in FIG. 8B, and a fully open position shown in FIG. 8C. The clasp 804 may include three pieces 804a, 804b, 804c that are hingedly coupled together, as depicted in FIGS. 8B and 8C. Protrusions 814 on one portion 804a of the clasp 804 are friction fit within openings 816 on the strap 802 to hold the clasp 804 in the closed position. It will be readily appreciated by one of ordinary skill in the art that other closure mechanisms may be used to hold the clasp 804 in the closed position. For example, the clasp 804 may be held in the closed position with a snap, button, magnetic closure, hook and loop fastener, or the like.

The display 806 may include a wearable screen that can be attached to the strap 802. The display 806 may be a pre-developed wearable smart watch screen or tracker screen. In other words, the band of the wearable device 800 may be coupled to a conventional smart watch or tracker screen.

The removable chip 812, also referred to herein as a help pull-pin chip, is positioned in an opening 820 (shown in FIG. 8C) in the strap 802. For example, the removable chip 812 may be friction fit within the opening 820. When the chip 812 is removed from the band 802, a camera positioned in the opening 820 is exposed. The wearable device 800 includes a sensor (such as the removal sensor interface 243) that is configured to determine that the removable chip 812 has been removed and to activate the camera when the chip 812 is removed. The wearable device 800 is further equipped with a processor that is configured to send an alert to a third party (such as a guardian, caregiver, emergency response personnel, or the like) to notify the third party that the chip 812 has been removed and that the user of the wearable device 800 may be having an emergency.

Figure 9:
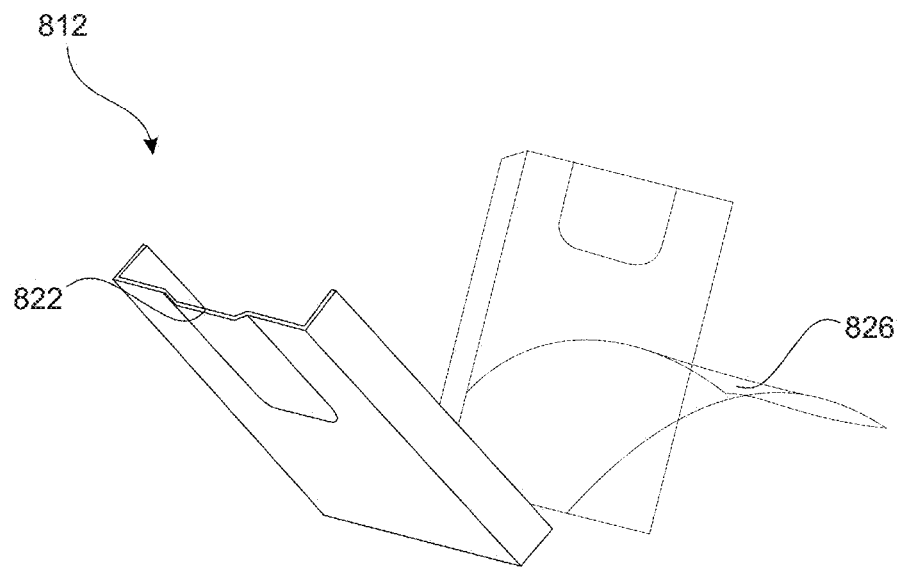
FIG. 9 is a perspective view of a removable chip that is part of the wearable device, in accordance with an exemplary embodiment of the invention.

The removable chip 812, as shown in greater detail in FIG. 9, includes a raised portion 822 that may be a projection, protrusion, bump, textured surface, or the like, to facilitate removal of the chip 812 from the strap 802. A user is able to find the chip 812 by feeling around for the protrusion 822 and is able to remove the chip 812 by inserting their fingernail under the protrusion 822 and applying upward pressure to remove the chip 812 from it's position in the opening 820 in the strap 802. Because of the protrusion 822, the user can find the chip 812 without looking, which may be advantageous in an emergency situation. The removable chip 812 also includes an adhesive backing and FIG. 9 depicts, in phantom, the removable chip 812 with the liner 826 being removed from the adhesive backing. The adhesive backing can be used to stick the removable chip 812 to a discreet location (such as behind the ear or neck, on/in a shoe, in a pocket, or the like) in the event that the rest of the wearable device 800 is taken and/or disposed of. The removable chip 812 includes GPS tracking and its own power source.

Figure 10A:
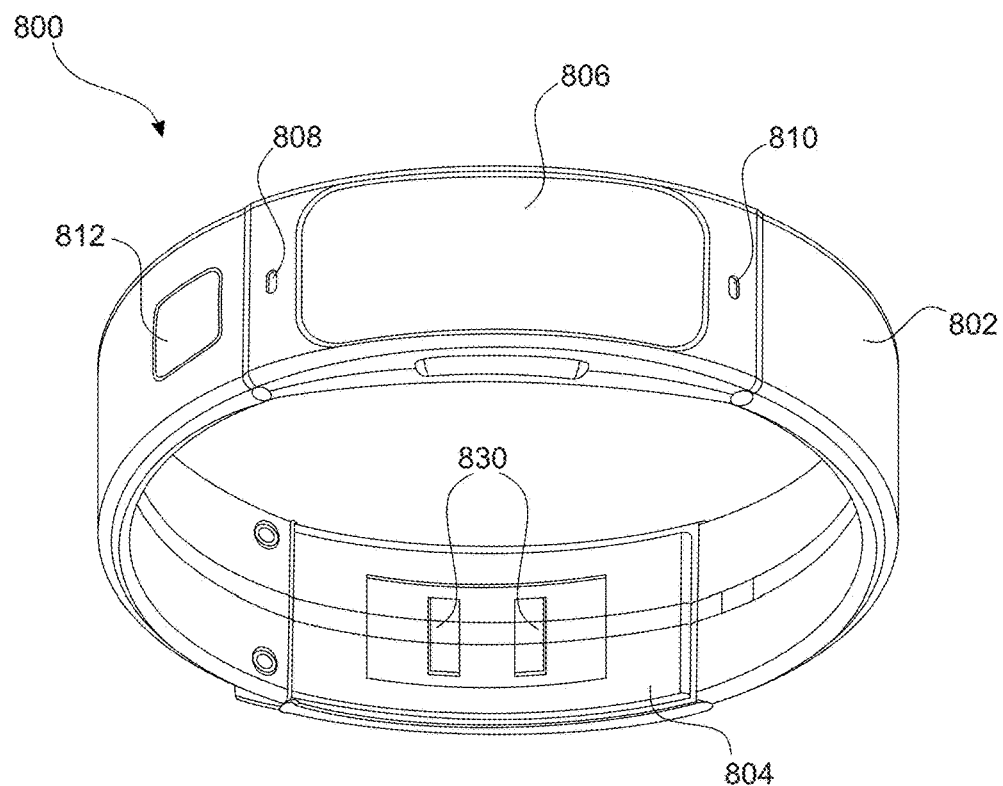
FIGS. 10A and 10B are perspective views of a wearable device in an unlocked configuration and a locked configuration, respectively, in accordance with an exemplary embodiment of the invention.
Figure 10B:
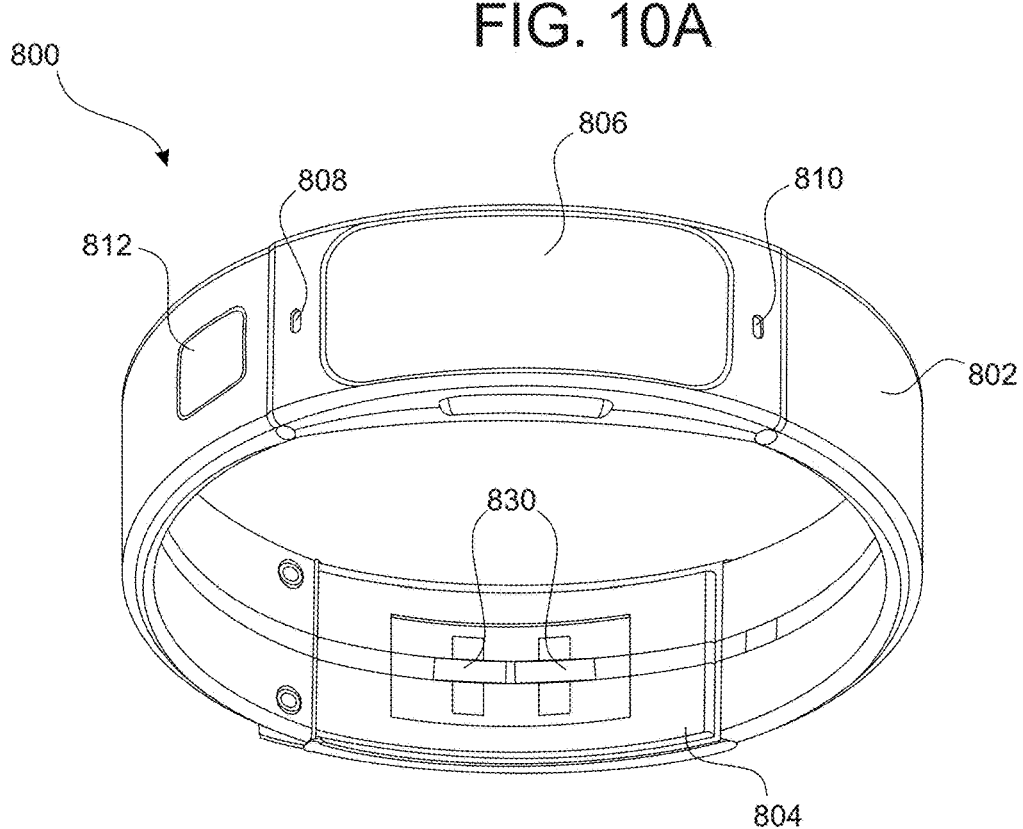

The clasp 804 of the wearable device 800 includes rotating locking elements, or contact sensors, 830 that are configured to rotate from an unlocked position depicted in FIGS. 8B, 8C and 10A to a locked position, depicted in FIG. 10B. When the rotating locking elements 830 are in the unlocked position, the elements 830 pass through the clasp openings 832 when the clasp 804 is closed. In order to lock the wearable device 800, a user inputs a unique code or pin number into an application on their mobile device to digitally lock the wearable device 800. After the code is input, the rotating locking elements 830 rotate to the locked position shown in FIG. 10B.

In order to unlock the wearable device 800, the user inputs their unique code or pin number into the mobile device application again to digitally unlock the wearable device 800. When the wearable device 800 is digitally unlocked, the rotating elements 830 rotate from the locked position to the unlocked position. In another example, when the user wants to adjust or temporarily remove the wearable device 800, simply undoing the clasp 804 will cause the rotating elements 830 to rotate to the unlocked position so the device 800 can be removed. If the device 800 is removed without digitally unlocking the device 800 by inputting the unique code into the mobile device application, a series of alerts will be triggered if the device 800 is not re-attached to the user within a predetermined amount of time.

Figure 11:
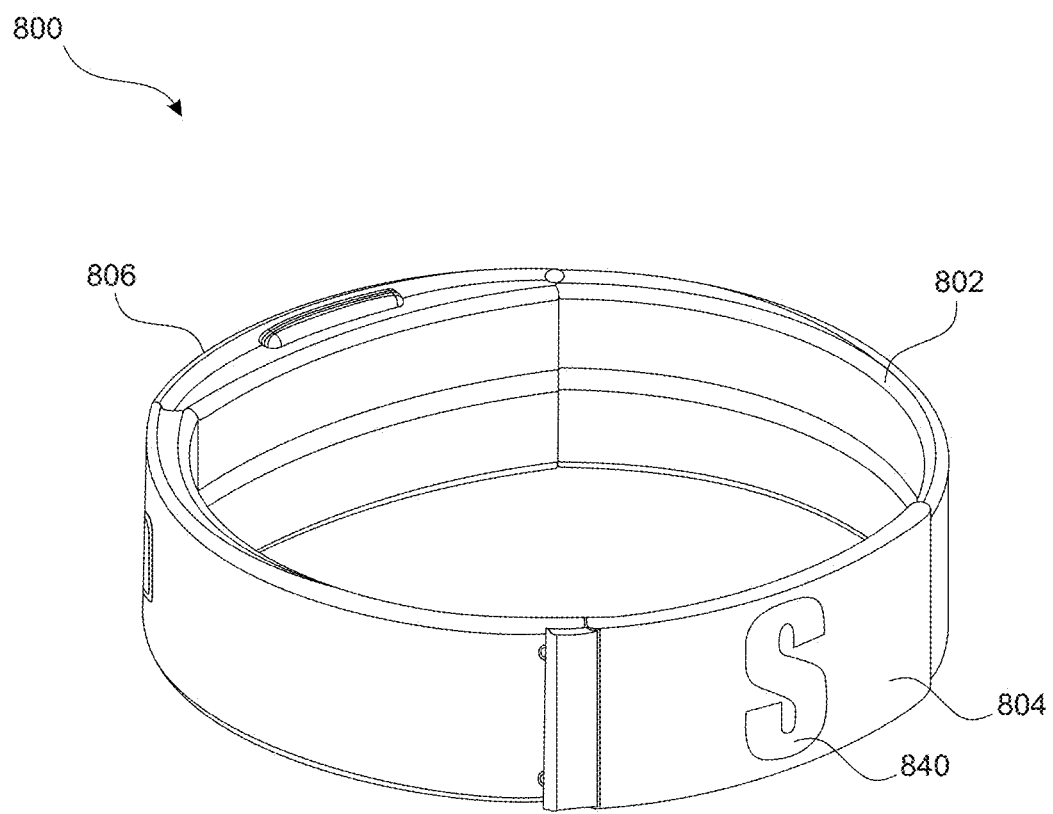
FIG. 11 is a perspective view of a visual indicator at the back of a wearable device, in accordance with an exemplary embodiment of the invention.

As shown in FIG. 11, the wearable device 800 further includes a visual indicator 840 on the outside of the clasp 804. In the example depicted in FIG. 11, the visual indicator 840 is an LED light that is configured to change color based on a status of the device 800. Although the visual indicator 840 is depicted as being an "S" symbol, one of ordinary skill in the art would recognize that the visual indicator may be any size or shape. Further, rather than a visual indicator, the wearable device may include an auditory, tactile, or any other kind of indicator. The purpose of the indicator 840 is to indicate a status of the device 800 to the user. For example, the indicator may turn blue to indicate that the device 800 is connected to Bluetooth, red to indicate that an emergency alert is being transmitted, yellow to indicate that the device 800 is in "concern" mode, green to indicate that the device 800 is in "safe" mode, or the like. One purpose of the visual indicator is to provide non-verbal communication to the user that help is on the way.

Figure 12:
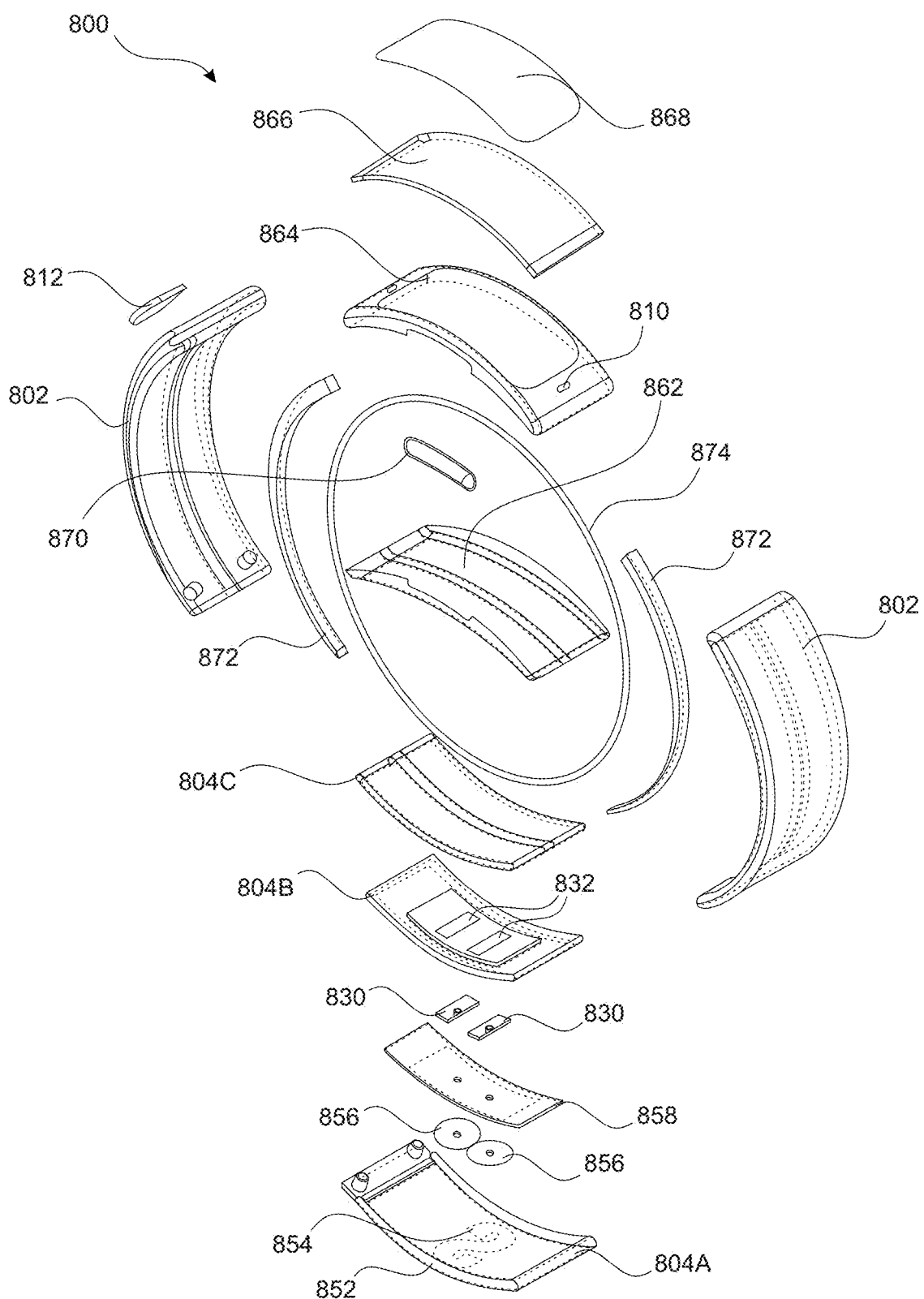
FIG. 12 is an exploded view of a wearable device, in accordance with an exemplary embodiment of the invention.

Some of the internal components of the wearable device 800 are depicted in FIG. 12. As shown in FIG. 12, the first portion 804a of the clasp includes the external portion 852 that houses the visual indicator 840. The visual indicator includes an opening or a window 854 through which the colored LED light passes to serve as a visual indicator to the user. The first portion 804a of the clasp also includes gear actuators 856 that are operably coupled to the rotating elements 830 to effect the rotation between the locked position and the unlocked position. The gear actuators 856 may include solenoid and/or lock actuators. The gear actuators 856 are sandwiched between the external portion 852 and a base plate 858. The middle portion 804b of the clasp includes the clasp openings 832 through which the rotating elements 830 protrude. The third portion 804c of the clasp is also depicted in FIG. 12.

The strap 802 is coupled to the watch face, which includes the watch face bottom 862, watch face top 864, internal elements 866 of the watch face, watch face cover 868, and button 870. The internal elements 866 of the watch face include an LED screen, GPS, battery, and the like. In alternative examples, the watch face is a conventional smartwatch or tracker screen having a display, touchscreen, input mechanism, or the like.

The inside surface of the strap 802 includes biometric sensor strips 872, which may include heart rate sensors, temperature sensors, accelerometers, pressure sensors, and the like. The strap 802 further includes a sensor film or cord 874 extends around the perimeter of the wearable device 800 in a continuous manner. The sensor cord 874, which is similar to, or associated with the detachment wire interface 225, includes pressure sensors that are in communication with the processor. If the sensor cord 874 is severed, damaged, or otherwise impaired, the processor emits an emergency alert. The sensor cord 874 is battery operated. The sensor cord 874 is further configured to detect when the device 800 is detached from the user. If the sensor cord 874 determines that the device 800 is detached while in the digitally locked position, the processor is configured to transmit an alert.

The wearable device 800 further includes a wrist scanner (not shown) configured to confirm the identity of the user. The wrist scanner is configured to scan and measure physical aspects of the wrist of the person wearing the device. The scanned data is then compared to stored data previously obtained from the registered user of the device. If the physical aspects detected by the wrist scanner match the stored physical aspects of the registered user, then the identity of the wearer is confirmed. If the physical aspects detected by the wrist scanner do not match the stored physical aspects of the registered user, then an alert is transmitted to indicate that the device 800 is being worn by an unauthorized user. In one example, the wrist scanner includes a clear window and an ultrasonic or light sensor having a transmitter and receiver. The clear window is in direct contact with the user's inner wrist when the wearable device 800 is attached to the user. The wrist scanner may be configured to measure vein dimension, wrist width, pronounced lines in the wrist, skin hue, handprints near the wrist, and/or the like.

The skilled person will be aware of a range of possible modifications of the various embodiments described above. Accordingly, the present invention is defined by the claims and their equivalents.

ADDITIONAL CONSIDERATIONS

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and/or a process associated with the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A user wearable monitoring device for improving personal security, the device comprising:
   a strap;
   a clasp attached to the strap, the clasp configured to move the strap between a closed position and an open position;
   a removable chip positioned in an opening on the strap and removably attached to the strap, wherein the removable chip includes GPS tracking and a power source;
   a camera embedded in the strap adjacent to the opening, wherein the camera is exposed when the chip is removed from the strap;
   a processor located within the strap, the processor configured to communicate with the camera and the removable chip, wherein the processor is configured to detect when the removable chip has been pulled out of the opening and to transmit an alert when the removable chip is removed from the strap.

2. The device of claim 1, wherein the removable chip comprises an adhesive back surface that is exposed when the removable chip is removed from the strap.

3. The device of claim 2, wherein the adhesive back comprises at least one of acrylic and rubber.

4. The device of claim 1, wherein the removable chip comprises a raised texture to facilitate removal of the chip from the opening on the strap.

5. The device of claim 1, wherein the clasp and the strap create an uninterrupted surface.

6. The device of claim 1, wherein the processor is configured to transmit the alert to a user device and a third party device.

7. The device of claim 1, wherein the processor is configured to activate the camera when the removable chip is pulled out of the opening in the strap.

8. The device of claim 1, further comprising contact sensors configured for rotating between a locked position and an unlocked position.

9. The device of claim 8, further comprising a gyroscope configured for detecting a position of the contact sensors.

10. A method of locking a wearable device which initiates monitoring and alerting for improving personal security, the method comprising:
    receive a first input signal from a contact sensor on a wearable device when the wearable device is in a first state;
    receive a second input signal from a user device that is paired with the wearable device;
    initiate a second state based on the received first input signal and the received second input signal;
    receive a state status from the contact sensor;
    indicate the state status on at least one of the wearable device and user device;
    when the second state status is received, begin receiving environmental data associated with the user by monitoring at least one of a signal from the user device and at least one sensor associated with the wearable device;
    generate a first context data by processing the environmental data;
    determine an alert state by applying a threshold to the first context data;
    trigger an alert based upon the alert state in at least one of the wearable device, first user device, and a second user device.

11. The method of claim 10, wherein the user device may be associated with at least one of the user wearing the wearable device and a second user located remotely from the user wearing the wearable device.

12. The method of claim 10, wherein the first input signal comprises pressure data from the contact sensor and the second input signal comprises a code sent from the user device.

13. The method of claim 10, wherein the first signal comprises gyroscope data received from a gyroscope associated with the wearable band.

14. The method of claim 10, wherein the indication of the state status may comprise at least one of providing a colored light located on the wearable device, vibration, blinking, and varying the color hue of colored light.

15. The method of claim 10, further comprising rotating the position of the contact sensor in response to initiating a second state.

16. The method of claim 10, wherein the contact sensor is positioned over a pressure sensor in the wearable device.

17. The method of claim 10, wherein the wearable device is removable by the user in a locked state.

18. The method of claim 10, wherein the at least one sensor may comprise biometric sensors, audio capture device, clasp status sensor, emergency pin status sensor, accelerometer, gyroscope, pressure sensor, and location data.

19. The method of claim 18, wherein the biometric sensors may comprise a heart rate sensor, body temperature sensor and a wrist sensor, the wrist sensor comprising an ultrasonic sensor or light sensor.

20. The method of claim 10, wherein the alert may comprise at least one of changing the state status; changing the state of the contact sensor, sending a message through wireless communication protocols, initiating data connection with an image sensor housed within the wearable device, initiating data connection with an audio sensor housed within the wearable device, transmitting image data from an image sensor associated with the wearable band, transmitting location data associated with the wearable band, transmitting location data associated with a removable chip located on the wearable band, initiating communication with the third device to send SMS and/or MMS to a user device or emergency services, and transmitting an audio signal to a speaker associated with the wearable device.

21. The method of claim 10, wherein wearable device may comprise a band, a clasp and a watch face housing.

22. A method of monitoring a user wearable device for improving personal security, the method comprising:
    receive a signal from a removal sensor associated with the removal of a chip associated with the wearable device;
    initiate a second state and change the state status in response to the signal;
    transmit the state status to at least one of a user device and the wearable device;
    initiate a first data connection with an image capture device located within the wearable device;
    receive a first data set from the first data connection;
    initiate a second data connection with an audio capture device located within the wearable device;
    receive a second data set from the second data connection;
    initiate a third data connection with a location capture device located within at least one of the wearable device and the chip;

receive a third data set from the third data connection;
transmit at least one of the first, second and third data set to a user device through SMS and/or MMS.

23. The method of claim 22, wherein the state status comprises a first non emergency state and a second emergency state.

24. The method of claim 22, wherein transmitting at least one of the first, second and third data set to a user device through SMS and/or MMS may be transmitted to emergency services.

25. The method of claim 22, further comprising providing audio and/or visual alerts to a display or speaker associated with the wearable device.

* * * * *